(12) United States Patent
Pilz et al.

(10) Patent No.: US 10,882,787 B2
(45) Date of Patent: Jan. 5, 2021

(54) METHOD FOR MANUFACTURING A SURFACE-TREATED PARTICULATE INORGANIC MATERIAL

(71) Applicant: SINTEF TTO AS, Trondheim (NO)

(72) Inventors: Monika Pilz, Eidsvoll (NO); Luxsacumar Sivakanesar, Frogner (NO); Ferdinand Mannle, Oppegard (NO)

(73) Assignee: FUNZIONANO AS, Porsgrunn (NO)

( * ) Notice: Subject to any disclaimer, the term of this patent is extended or adjusted under 35 U.S.C. 154(b) by 82 days.

(21) Appl. No.: 15/755,989

(22) PCT Filed: Aug. 26, 2016

(86) PCT No.: PCT/EP2016/070222
§ 371 (c)(1),
(2) Date: Feb. 27, 2018

(87) PCT Pub. No.: WO2017/036976
PCT Pub. Date: Mar. 9, 2017

(65) Prior Publication Data
US 2019/0084879 A1    Mar. 21, 2019

(30) Foreign Application Priority Data
Aug. 28, 2015   (EP) .................................. 15182939

(51) Int. Cl.
*C04B 20/10* (2006.01)
*C04B 28/02* (2006.01)
(Continued)

(52) U.S. Cl.
CPC .......... *C04B 20/1051* (2013.01); *C04B 28/02* (2013.01); *C04B 28/14* (2013.01);
(Continued)

(58) Field of Classification Search
CPC .................................................. C04B 20/1051
See application file for complete search history.

(56) References Cited

U.S. PATENT DOCUMENTS 2,730,841 A    1/1956   Searight
3,769,065 A   10/1973   Dunn
(Continued)

FOREIGN PATENT DOCUMENTS

CN    101203378 A    6/2008
CN    101237860 A    8/2008
(Continued)

OTHER PUBLICATIONS

Palmof et al., "Catalysis of the Crosslinking Reactions of Ethylene Vinyl Silane Copolymers Using Carboxylic Acids and DBTDL," 1999, J. Appl. Poly. Sci. 72, pp. 521-528. (Year: 1999).*
(Continued)

*Primary Examiner* — Robert A Vetere
(74) *Attorney, Agent, or Firm* — Brinks Gilson & Lione; John C. Freeman

(57) ABSTRACT

This invention relates to a method for manufacturing a surface-treated particulate inorganic material, and more particularly to methods for manufacturing lightweight particulate inorganic materials, such as expanded perlite or expanded clay, coated with one or more silsesquioxanes. The surface-treated particulate inorganic material according to the present invention is suited for introduction into construction materials, such as mortar, piaster, cement and lightweight concrete, to lower the loose bulk density and improve the mechanical strength of the mixture.

31 Claims, 9 Drawing Sheets

(51) Int. Cl.
*C04B 28/14* (2006.01)
*C04B 111/27* (2006.01)
*C04B 111/40* (2006.01)
*C04B 103/40* (2006.01)

(52) U.S. Cl.
CPC ....... *C04B 2103/40* (2013.01); *C04B 2111/27* (2013.01); *C04B 2111/40* (2013.01); *Y02W 30/91* (2015.05)

(56) References Cited

U.S. PATENT DOCUMENTS

| | | | |
|---|---|---|---|
| 4,141,751 A | | 2/1979 | Moreland |
| 4,183,980 A | | 1/1980 | Nielsen |
| 4,255,489 A | | 3/1981 | Nielsen |
| 4,462,835 A | * | 7/1984 | Car ................ C04B 28/24 106/602 |
| 4,525,388 A | | 6/1985 | Rehder et al. |
| 4,889,747 A | | 12/1989 | Wilson |
| 5,679,147 A | * | 10/1997 | Standke ............ C09D 183/08 106/287.11 |
| 6,408,649 B1 | | 6/2002 | Sklyarevich et al. |
| 7,276,132 B2 | * | 10/2007 | Davies ................ B29C 70/081 156/148 |
| 9,345,667 B2 | | 5/2016 | Kong et al. |
| 2003/0124564 A1 | * | 7/2003 | Trau ....................... C08G 77/06 435/6.12 |
| 2005/0271968 A1 | * | 12/2005 | Asano .................... G03G 5/005 430/125.32 |
| 2009/0151603 A1 | * | 6/2009 | Francis .................... E06B 5/16 106/675 |
| 2009/0246279 A1 | | 10/2009 | Kong et al. |
| 2009/0247712 A1 | * | 10/2009 | Tanaka ............... C08G 65/2609 525/451 |
| 2015/0079348 A1 | | 3/2015 | Mizoshita et al. |

FOREIGN PATENT DOCUMENTS

| | | |
|---|---|---|
| EP | 0716128 A2 | 6/1996 |
| EP | 2 444 460 A1 | 4/2012 |
| WO | WO 02/08343 A2 | 1/2002 |
| WO | WO 2005/100450 A1 | 10/2005 |
| WO | WO-2005100450 A1 * | 10/2005 ............... C07C 7/10 |
| WO | WO 2006/081512 A2 | 8/2006 |
| WO | WO-2006081512 A2 * | 8/2006 ............... C07C 7/21 |
| WO | 2014023932 | 2/2014 |
| WO | WO 2015/057895 A1 | 4/2015 |

OTHER PUBLICATIONS

Extended European Search Report for EP 15182939.7, dated Feb. 22, 2016.
International Search Report and Written Opinion for PCT/EP2016/070222, dated Oct. 19, 2016.
International Preliminary Report on Patentability for PCT/EP2016/070222, dated Mar. 7, 2018.
U.S. Department of the Interior, Bureau of Mines, Washington. Perlite: US Minerals Yearbook 1989, vol. I: Metals and Minerals, pp. 765-767.
Peppas, M. Taxiarchou, E. Koffa, T. Karalis, A. Amanatidis, Development of closed porous microcellular products from perlite. AMIREG 2006 Conference, Sep. 2006, Hania, Greece, 7 pages.
J.E. Kogel, N.C. Trivedi, J.M. Barker, S.T. Krukowski: Perlite, by J.M. Barker and K. Santini. Industrial Minerals and Rocks, 7th edition, 2006, pp. 685/702.
M. Roulia, K. Chassapis, A. Kapoutsis, E.I. Kamitsos, T. Savvidis: Influence of thermal treatment on the water realise and the glassy structure of perlite. J. Marer Sci, 2006, vol. 41, pp. 5870/5881.
Av.A. Varuzhanyan, Ar. A. Varuzhanyan, H. A. Varuzhanyan: A mechanism of perlite expansion. Inorganic Materials, ISSN 0020/1685, 2006, vol. 42 (9), pp. 1039/1045.
Search Report dated Jun. 15, 2020 from corresponding Chinese Patent Application No. 201680063815.1 (3 pages).
Office Action dated Jun. 15, 2020 from corresponding Chinese Patent Application No. 201680063815.1 (3 pages).
Partial English translation of Office Action dated Jun. 15, 2020 from corresponding Chinese Patent Application No. 201680063815.1 (7 pages).

* cited by examiner

METHOD FOR MANUFACTURING A SURFACE-TREATED PARTICULATE INORGANIC MATERIAL

RELATED APPLICATIONS

This application claims the benefit under 35 U.S.C. § 371 of the filing date of International Patent Application No. PCT/EP2016/070222, having an international filing date of Aug. 26, 2016, which claims priority to European Application No. 15182939.7, filed Aug. 28, 2015, the contents of both of which are incorporated herein by reference in their entirety.

FIELD OF THE INVENTION

This invention relates to a method for manufacturing a surface-treated particulate inorganic material, and more particularly to methods for manufacturing lightweight particulate inorganic materials, such as expanded perlite or expanded clay, coated with one or more silsesquioxanes. The surface-treated particulate inorganic material according to the present invention is suited for introduction into construction materials, such as mortar, plaster, cement and lightweight concrete, to lower the loose bulk density and improve the mechanical strength of the mixture.

BACKGROUND OF THE INVENTION

Particulate inorganic materials, such as traditional mineral fillers, have played and will continue to play a very significant role in the development of our modern industrialized society as they are essential raw materials for very important industrial sectors, including chemical, construction, manufacturing and automotive sector. Among the various particulate inorganic materials needed by the industry, expanded perlite is highly important, both from technological and economic point of view.

Expanded perlite is a particulate, lightweight material that is available in commercial quantities and at commercially viable prices. The expanded form of perlite is typically produced by heat treatment of perlite ore, an igneous mineral consisting primarily of silica and small amounts of alumina in a structure combined with a small percentage of water. When perlite ore is heated, typically to a temperature above 870° C., the perlite particles become soft and the contained water is abruptly vaporized and released from the structure. Proper selection of the ore size, heating rate and temperature of the heat treatment will result in a final expanded product having a loose bulk density (lbd) of approximately 30-150 kg/m$^3$ as compared with the lbd of the perlite ore, approximately 1100 kg/m$^3$.

The relatively low lbd of conventionally expanded perlite makes it suited for introduction into construction materials, such as mortar, plaster, cement and lightweight concrete, to lower the lbd of the mixture. However, although conventionally expanded perlite has several favorable properties, it is also characterized by some drawbacks which may limit the range of its applications and adversely affect the quality of expanded perlite-based end products.

One factor that may negatively affect the quality of expanded perlite-based end products is the capability of the expanded perlite particles to absorb water. When expanded perlite particles are placed in contact with water, the water will typically penetrate the cracks and fissures on the surface and enter into the interior air filled cavities of the expanded perlite particles. The entrained water may cause expanded perlite to lose some of its lightweight characteristics, and in admixture with or as additive in construction materials, such as mortar, plaster, cement and lightweight concrete, it may also interfere with the carefully calculated doses of mix water chosen to achieve a specific strength with certain degree of workability. Thus, there is a need for obtaining low density particulate inorganic materials, expanded perlite in particular, with reduced water uptake.

Prior efforts for obtaining low density particulate inorganic materials, expanded perlite in particular, with reduced water uptake have routinely focused on hydrophobic coatings to seal the surface thereof. The principle of applying coatings on low density particulate inorganic materials is therefore not per se unique to the present invention.

U.S. Pat. No. 3,769,065 discloses a process of coating expanded perlite by applying an aqueous acid solution to the particles, then applying an aqueous sodium silicate solution followed by another acid treatment, and drying the coated particles.

U.S. Pat. Nos. 4,183,980 and 4,255,489 disclose a strengthened coated expanded perlite obtained by contacting the previously expanded perlite with an emulsion of polysiloxane, drying the coated particles as in a moving stream of hot gas, and then a further extended heat treatment in an oven at a temperature of 288-454° C. to cure and strengthen the polysiloxane.

U.S. Pat. No. 4,525,388 discloses coating and curing expanded perlite with a hydrophobic material, e.g. water dilutable emulsions of polymethyl siloxane, integrated with the process of producing the expanded perlite.

U.S. Pat. No. 4,889,747 discloses expanded perlite compositions containing thereon, therein, or thereon and therein buffered emulsions of aqueous silanes and/or oligomers thereof which render the expanded perlite water repellent.

Coatings of other particulate inorganic materials are also known, with U.S. Pat. No. 4,141,751, for example, disclosing spraying a silane coupling agent onto fine particulate inorganic solids, while agitating those solids in a high intensity mixer to develop shearing friction temperatures for curing, and drying the coated particles.

U.S. Pat. No. 2,730,841 discloses the production of silicone coated glass beads by spraying a siloxane dispersion onto hot glass beads after they have been separated from formation exhaust gases and allowing the coated beads to cure from 2 to 24 hours on exposure to ambient air.

EPO 716 128 discloses a process of coating building materials like lime sand brick, brick and mortar by immersing the building materials in a water-based organic polysiloxane containing composition. The coated building materials has a reduced tendency to absorb water as compared to non-coated building materials. The water-based organic polysiloxane is prepared by mixing a water soluble aminoalkylalkoxy silane with at least one silane that is not water soluble. The copolymer is not subjected to any subsequent hydrophobicizing steps and will therefore have a significant number of hydrophilic groups on the surface. These hydrophilic groups are believed to be essential for the organic polysiloxane to remain water soluble.

US2015/0079348 discloses a method for producing an antireflection film. A first polymer is prepared by hydrolysis and condensation of a metal alkoxide (tetraethoxysilane). The average particle diameter of the first polymer is in the range 30 to 200 nm, more preferably in the range 70 to 150 nm. If the average particle diameter is less than the lower limit, sufficient antireflection properties cannot be obtained. The first polymer is then reacted with hexamethyldisiloxane (hydrophobicizing agent), resulting in nanoparticles with a metal oxide framework whose surface is protected with trimethylsilyl groups. These protected nanoparticles are not brought into contact with a particulate inorganic material, but instead they are mixed with a metal alkoxide (tetraethoxysilane), HCl and water and incubated at room temperature for 24 hours to form mixed sol dispersion liquid. A glass substrate, which is not in particulate form, is then dip coated with the mixed sol dispersion liquid to form coating films on both surfaces of the glass substrate. The coating films are then subjected to calcination at 500° C. During calcination the hydrophobic groups (trimethylsilyl groups) introduced to the surface of the nanoparticles are decomposed and covalent bonds are formed between the nanoparticles and the mesoporous transparent material formed from the metal alkoxide. It is preferred to have a hydrophobic surface, and the film obtained after calcination is therefore preferably subjected to hydrophobizing treatment.

Another factor that may negatively affect the quality of expanded perlite-based end products is the relatively poor mechanical strength of expanded perlite. Low density industrial minerals, such as expanded perlite, typically have a cellular structure and are therefore more porous than ordinary crushed rock. This porous structure being the main reason why these low-density particulate inorganic materials typically suffer from relatively poor mechanical strength. When these structures are introduced into construction materials, such as mortar, plaster, cement and lightweight concrete, the construction materials will typically inherit, at least to some extent, the properties of the low-density particulate inorganic materials. In addition to being important for the mechanical strength of the expanded perlite-based end product, the mechanical strength of the expanded perlite is also important for retaining its low density properties during mixing, pumping etc. If the mechanical strength is not satisfactory, there is a risk that the porous structures will be destroyed during mixing, pumping etc. with the result that the expanded perlite-based end product loses its low density properties. Thus, there is a need for obtaining low density particulate inorganic materials, expanded perlite in particular, with improved mechanical strength.

Although the mechanical strength of the low density particulate inorganic materials per se may affect the mechanical strength of the construction material, the bonding between the particulate inorganic material and the material into which it is introduced is also of importance. A strong bonding is typically associated with relatively high mechanical strength while weak bonding is typically associated with relatively low mechanical strength. Thus, there is a need for obtaining low density particulate inorganic materials that has good bonding with the material into which it is introduced.

While the principle of applying hydrophobic coatings on particulate inorganic materials to improve the bonding between the particulate inorganic material and the material into which it is introduced has been thoroughly discussed in the prior art, the durability of the surface coating has so far not been given much attention. If the durability is unsatisfactory, the coating will easily be washed off with the result that the properties provided by the coating are lost within a short period of time. Satisfactory durability is therefore of most importance to ensure a prolonged effect.

In spite of the recent significant advances within this field of technology, there is still a continued need to find new features that i) reduce the water absorption capabilities of low density particulate inorganic materials; ii) improve the mechanical strength of low density particulate inorganic materials; and iii) improve the mechanical strength of low density particulate inorganic material-based end products.

SUMMARY OF THE INVENTION

A first aspect of the present invention relates to a method for manufacturing a surface-treated particulate inorganic material, the method comprising the following steps:
providing a particulate inorganic material; and
bringing the particulate inorganic material into contact with a composition comprising at least one surface treating agent;
wherein
the at least one surface treating agent is an organic-inorganic hybrid polymer;
the organic-inorganic hybrid polymer being selected from the group of polymers obtainable by a process comprising the following step(s):
a) forming a polymer by controlled hydrolysis and condensation of one type of silane selected from the group of silanes represented by the following general formula: $(X-L-)_n Si(-Y)_{4-n}$; or
forming a polymer by controlled hydrolysis and condensation of at least two different types of silanes independently selected from the group of silanes represented by the following general formula: $(X-L-)_n Si(-Y)_{4-n}$;
wherein
X is $-NR_1R_2$, $-N=C=O$, SH or OH
$R_1$ and $R_2$ are residues independently selected from the group consisting of hydrogen; non-substituted or substituted, saturated or unsaturated $C_1$-$C_{25}$ hydrocarbon radical which may be straight, branched or cyclic; aliphatic or aromatic carbonyl; and substituted or non-substituted aryl; wherein the carbon chains of said residues optionally can include one or more of the elements oxygen, nitrogen, sulphur, phosphorous, silicon or boron; or $R_1$ and $R_2$ are independently selected from the group consisting of condensation products, addition products of one or more type of chemical substances such as acids, alcohols, phenols, amines, aldehydes or epoxides;
n is 1 or 2;
L is a direct bond; or a residue selected from the group consisting of non-substituted or substituted, saturated or unsaturated $C_1$-$C_{25}$ hydrocarbon radical which may be straight, branched or cyclic; and substituted or non-substituted arylene; wherein the carbon chains of said residues optionally can include one or more of the elements oxygen, nitrogen, sulphur, phosphorous, silicon or boron; and
Y is a hydrolysable group or OH;
and
b) if X is $-NR_1R_2$ and at least one of $R_1$ and $R_2$ is H for the selected silane(s) or for at least one of the selected silanes; or X is $-N=C=O$, SH or OH for the selected silane(s) or for at least one of the selected silanes
adding at least one reactant capable of forming a covalent bond between an atom of the X group and at least one atom of the reactant;
the at least one reactant being a compound selected from the group consisting of cyclic anhydride and a compound of formula R—Z,
wherein
R is a residue selected from the group consisting of a non-substituted or substituted, saturated or unsaturated $C_1$-$C_{25}$ hydrocarbon radical which may be straight, branched or cyclic; aliphatic or aromatic carbonyl; and substituted or non-substituted aryl; wherein the carbon chains of said residues optionally can include one or more of the elements oxygen, nitrogen, sulphur, phosphorous, silicon or boron; or a residue selected from the group consisting of condensation products, addition products of one or more type of chemical substances such as acids, alcohols, phenols, amines, aldehydes or epoxides; and Z is a residue selected from the group consisting of alkoxyl, aryloxyl, cycloalkoxyl, carboxyl, formyl, acyl halide, isocyanate, hydroxyl, amine, epoxide, ester and halogen;

and c) if X is —NR$_1$R$_2$ for the selected silane(s) or for at least one of the selected silanes optionally, adding an acid that is capable of converting the N-atom of the X group to quaternary nitronium ions.

In a first embodiment according to the first aspect of the present invention, the particulate inorganic material is selected from the group consisting of perlite, expanded perlite, bentonite, diatomite, silica, barite, gypsum, limestone, kaolin, clay, expanded clay, biochar, mica, talc, vermiculite, synthetic calcium silicate hydrate, natural silicates, volcanic ash and other volcanic products such as fly ash and glass, slag, pumice, shale, synthetic silicates, alumino silicates, diatomaceous earth, wollastonite, slate, expanded slate; or any mixture thereof.

In a second embodiment according to the first aspect of the present invention, the particulate inorganic material has an effective particle density or a loose bulk density in the range 10-950 kg/m$^3$, preferably in the range 30-150 kg/m$^3$.

In a third embodiment according to the first aspect of the present invention the step of bringing the particulate inorganic material into contact with a composition comprising at least one surface treating agent involves applying at least one layer of the composition comprising at least one surface treating agent onto the particulate inorganic material.

In a fourth embodiment according to the first aspect of the present invention, the ratio of particulate inorganic material: surface treating agent(s) is in the range 99.9:0.1 pbw to 70:30 pbw.

In a fifth embodiment according to the first aspect of the present invention, X is —NR$_1$R$_2$ for at least one of the selected silanes.

In a sixth embodiment according to the first aspect of the present invention, L is a residue selected from the group consisting of non-substituted or substituted, saturated or unsaturated C$_1$-C$_{25}$ hydrocarbon radical which may be straight, branched or cyclic; and substituted or non-substituted arylene; wherein the carbon chains of said residues optionally can include one or more of the elements oxygen, nitrogen, sulphur, phosphorous, silicon or boron. In another embodiment, L is a residue selected from the group consisting of non-substituted or substituted, saturated or unsaturated C$_1$-C$_{25}$ hydrocarbon radical which may be straight, branched or cyclic; and substituted or non-substituted arylene; wherein the carbon chains of said residues optionally can include one or more of the elements oxygen, nitrogen, sulphur, phosphorous, silicon or boron for at least one of the selected silanes.

In a seventh embodiment according to the first aspect of the present invention, Y is OH; or a hydrolysable group selected from the group consisting of alkoxyl, aryloxyl, carboxyl, and halogen. In another embodiment, Y is OH or a hydrolysable group selected from the group consisting of alkoxyl, aryloxyl, carboxyl, and halogen for at least one of the selected silanes.

In an eighth embodiment according to the first aspect of the present invention, the at least one reactant is selected from the group consisting of a cyclic anhydride such as phthalic anhydride, a C$_1$-C$_{25}$ salicylate such as methyl salicylate, saturated or unsaturated C$_1$-C$_{25}$ fatty acid, C$_1$-C$_{25}$ 4-hydroxybenzoate such as methyl 4-hydroxybenzoate, a monobasic ester formed from an organic acid such as methyl lactate, and an epoxide.

In a ninth embodiment according to the first aspect of the present invention, the particulate inorganic material is expanded perlite;

step a) involves forming a polymer by controlled hydrolysis and condensation of one type of silane selected from the group of silanes represented by the following general formula: (X-L-)$_n$ Si(—Y)$_{4-n}$;

X is —NH$_2$;

n is 1;

L is —CH$_2$—CH$_2$—CH$_2$—; and

Y is —O—CH$_2$—CH$_3$.

In a tenth embodiment according to the first aspect of the present invention, the particulate inorganic material is expanded perlite;

step a) involves forming a polymer by controlled hydrolysis and condensation of one type of silane selected from the group of silanes represented by the following general formula: (X-L-)$_n$ Si(—Y)$_{4-n}$;

X is —NH$_2$;

n is 1;

L is —CH$_2$—CH$_2$—CH$_2$—;

Y is —O—CH$_2$—CH$_3$; and the at least one reactant is behenic acid.

In a further embodiment according to the present invention, the composition comprising at least one surface treating agent is a water-based composition comprising at least one surface treating agent. Preferably, the water-based composition comprising at least one surface treating agent further comprises at least one emulsifier.

In a yet further embodiment according to the present invention, the composition comprising at least one surface treating agent is emulsified in water with the aid of at least one emulsifier.

In a further embodiment according to the present invention, the particulate inorganic material is not a transparent material, in particular not glass.

In a yet further embodiment according to the present invention, the X-groups of the polymer obtained by process steps a) to c) provides the polymer with a hydrophobic surface; and the polymer obtained by process steps a) to c) is not subjected to heat treatment which would decompose the hydrophobic surface of the polymer.

In a further embodiment according to the present invention, the X-groups of the polymer obtained by process steps a) to c) provides the polymer with a hydrophobic surface; and the surface-treated particulate inorganic material is not subjected to heat treatment which would decompose the hydrophobic surface of the polymer.

In a yet further embodiment according to the present invention, the surface-treated particulate inorganic material is not subjected to calcination.

In a further embodiment according to the present invention, the surface-treated particulate inorganic material and/or the polymer obtained by process steps a) to c) is not subjected to heat treatment at temperatures above 300° C.

In a further embodiment according to the present invention, the process comprising steps a) to c) does not include a subsequent step of adding a metal alkoxide.

In a further embodiment according to the present invention, a metal alkoxide is not added to the composition comprising at least one surface treating agent.

In a further embodiment according to the present invention, the organic-inorganic hybrid polymer has an average particle diameter of less than 30 nm, such as 1 nm to 29 nm or 1 nm to 20 nm.

In a further embodiment according to the present invention, the organic-inorganic hybrid polymer prepared by step a) to c) is not covalently attached to other polymers that have an average particle diameter that is less than 80% of the average particle diameter of the at least one surface treating agent.

A second aspect of the present invention relates to a surface-treated particulate inorganic material obtainable by the method according to the first aspect of the present invention.

A third aspect of the present invention relates to use of a surface-treated particulate inorganic material according to the second aspect of the present invention, in admixture with construction materials or as additive in construction materials, the construction materials preferably being selected from the group consisting of plasters, cement, lightweight concrete, mortar, artificial stone, bricks, plastic, composite materials, paint, coating, thermoplastic foam and thermoset foam.

A fourth aspect of the present invention relates to a construction material comprising the surface-treated particulate inorganic material according to the second aspect of the present invention, the construction material preferably being selected from the group consisting of plasters, cement, lightweight concrete, mortar, artificial stone, bricks, plastic, composite materials, paint, coating, thermoplastic foam and thermoset foam.

DESCRIPTION OF THE FIGURES

Preferred embodiments of the present invention will now be illustrated in more detail with reference to the accompanying figures.

Y-axis: weight loss measured by thermogravimetric analysis (% wt)

X-axis temperature (° C.).

Figure 2:
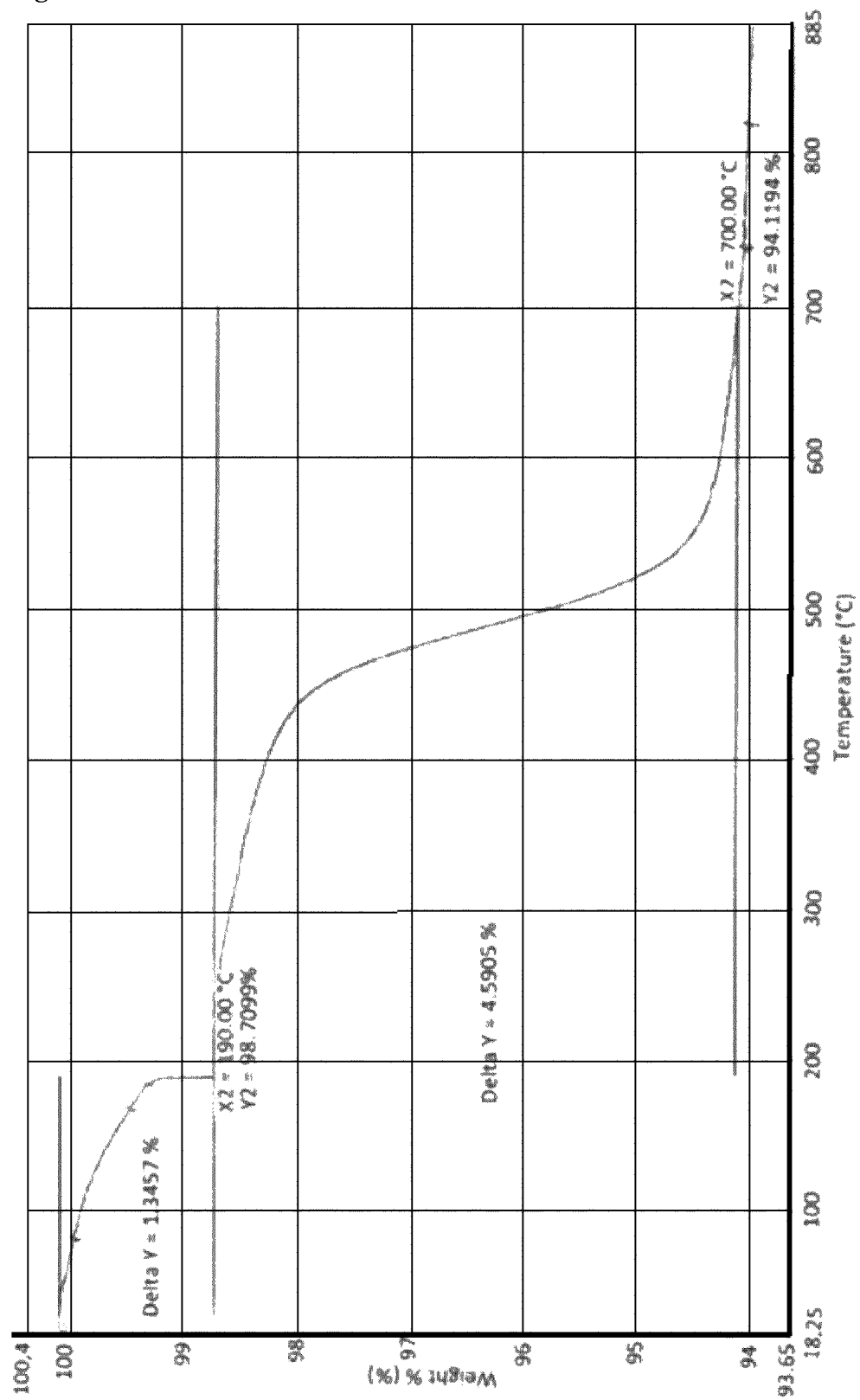

FIG. 2 illustrates the results of a thermogravimetric analysis of conventionally expanded perlite coated with organic-inorganic hybrid polymer (example 2b). High mass loss corresponds to high amount of organic-inorganic hybrid polymer deposited on the perlite particles.

Y-axis: weight loss measured by thermogravimetric analysis (% wt).

X-axis temperature (° C.).

Figure 3:
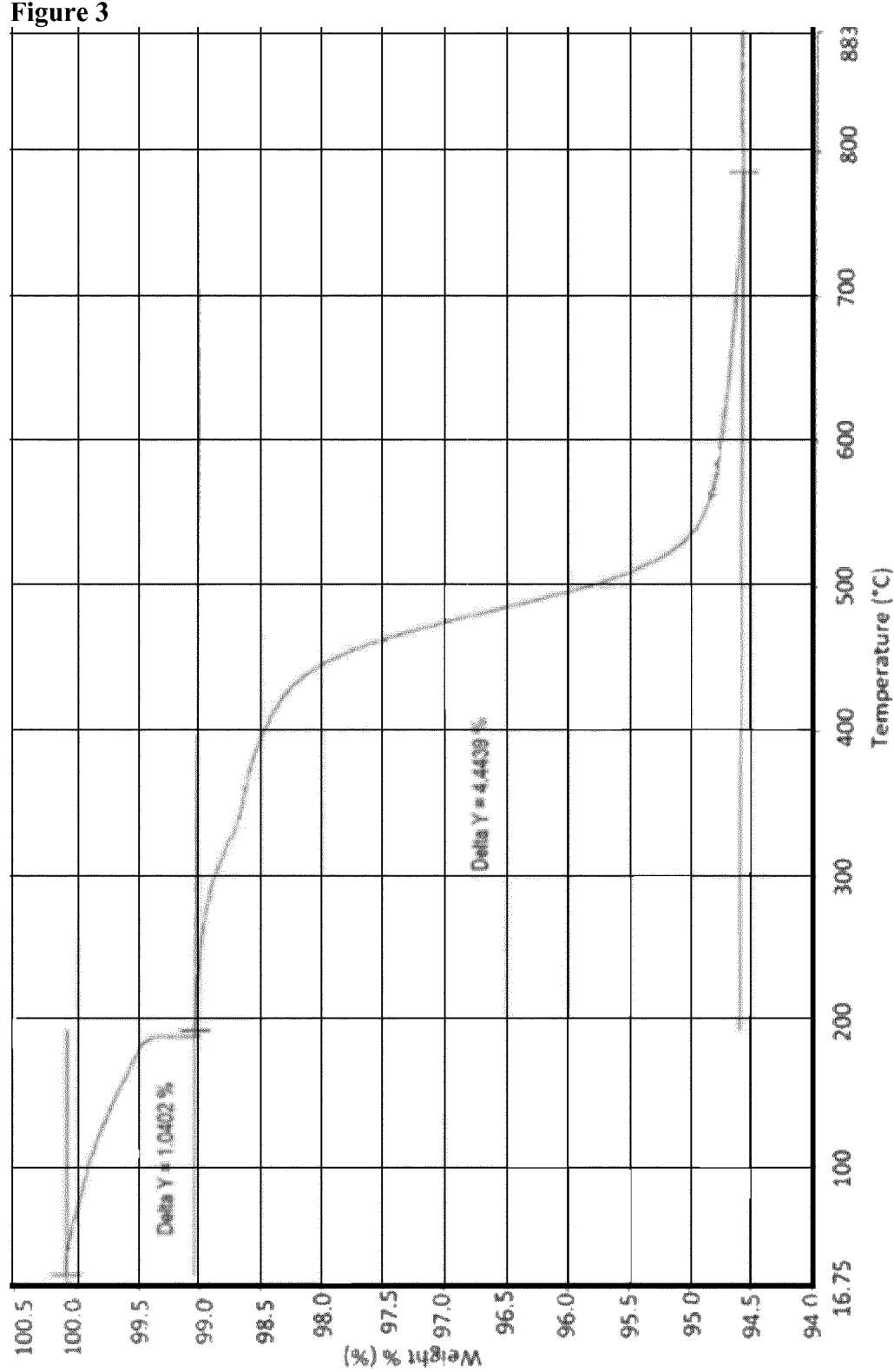

FIG. 3 illustrates the results of a thermogravimetric analysis of conventionally expanded perlite coated with organic-inorganic hybrid polymer (example 2c). High mass loss corresponds to high amount of organic-inorganic hybrid polymer deposited on the perlite particles.

Y-axis: weight loss measured by thermogravimetric analysis (% wt).

X-axis temperature (° C.).

Figure 4:
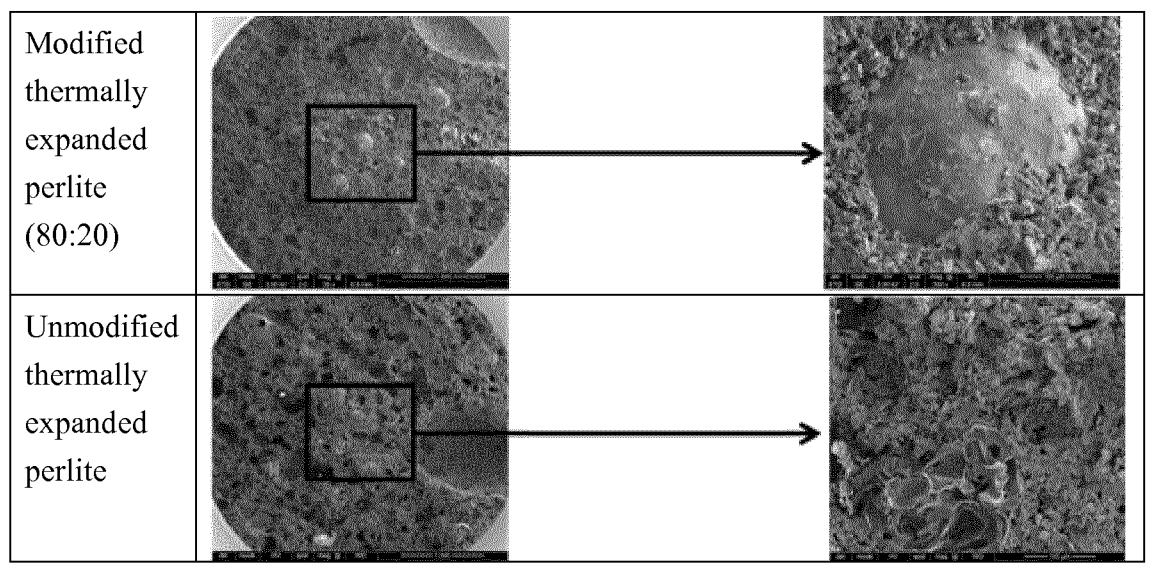

FIG. 4 illustrates the fracture surface of a gypsum plaster formulation containing either thermally expanded perlite coated with organic-inorganic hybrid polymer (modified thermally expanded perlite (80:20)) or thermally expanded perlite (unmodified thermally expanded perlite).

Figure 5:
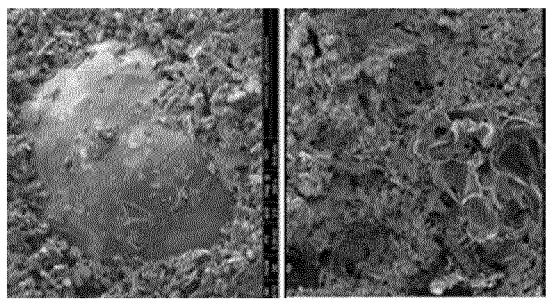

FIG. 5 illustrates the fracture surface of a gypsum plaster formulation containing either thermally expanded perlite coated with organic-inorganic hybrid polymer (left) or non-coated thermally expanded perlite (right). The undamaged coated perlite particle after fracture clearly illustrate the improved mechanical strength of coated particle as compared to non-coated particle.

Figure 6:
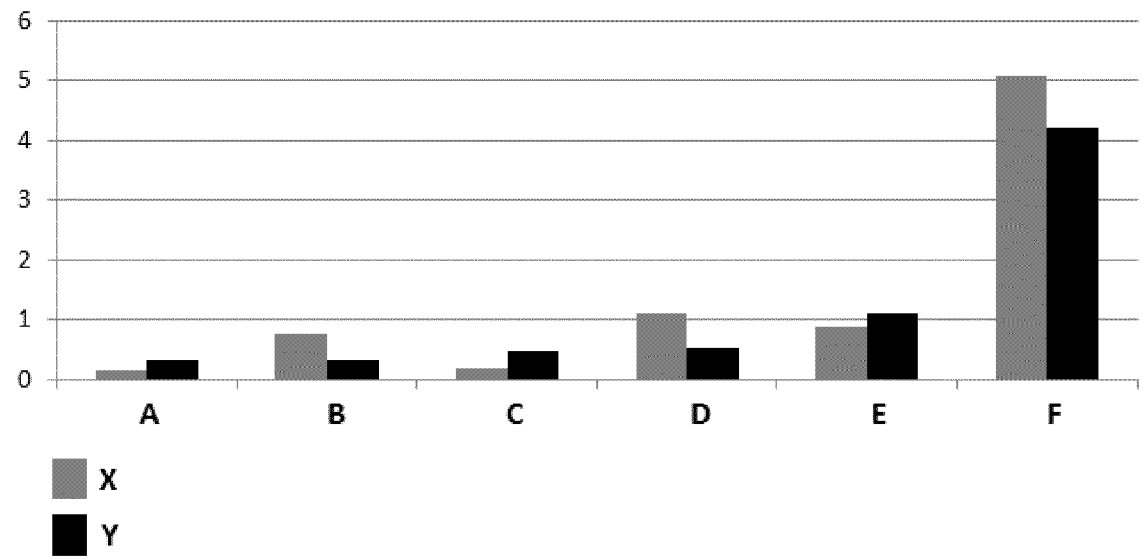

FIG. 6 shows the result of a test demonstrating the durability of surface coatings on expanded perlite.

Y-axis weight loss measured by thermogravimetric analysis (% wt).

X-axis Different type of surface coating

A represents non-coated expanded perlite (reference)

B represents expanded perlite coated with silicon oil

C represents expanded perlite coated with hexamethyldisiloxane

D represents expanded perlite coated with stearic acid

E represents expanded perlite coated with k-stearate

F represents expanded perlite coated with organic-inorganic hybrid polymer

X represents before washing procedure

Y represents after washing procedure

Figure 7:
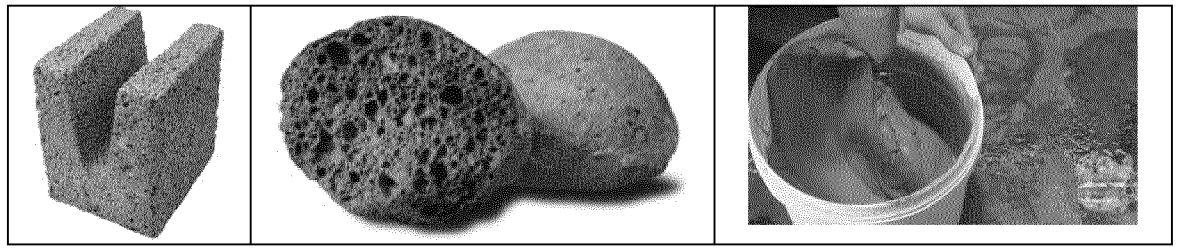

FIG. 7 illustrates expanded particulate inorganic material which has been poured into cement to form a block (left); expanded particulate inorganic material which typically finds use as a drainage material (middle); and expanded particulate inorganic material which has been introduced into a mortar (right).

Figure 8:
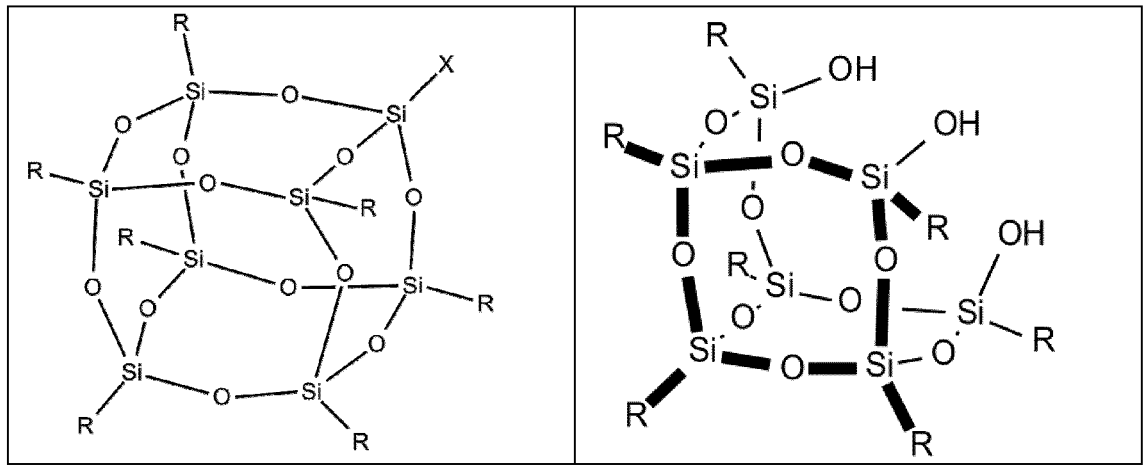

FIG. 8 illustrates a cubic polyhedral oligomeric silsesquioxane (left) and a partially condensed siloxane (right).

Figure 9:
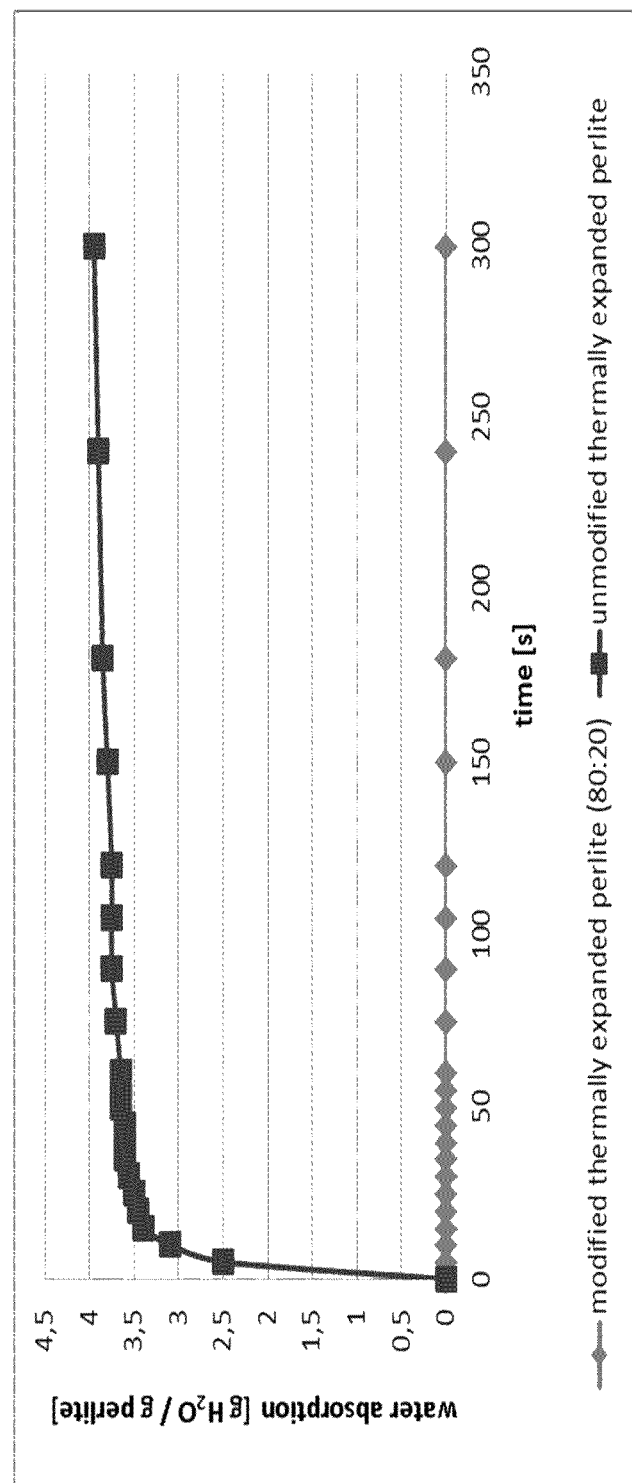

FIG. 9 illustrates water absorption capabilities for modified thermally expanded perlite (80:20) and unmodified thermally expanded perlite, ref. example 3c.

Figure 10:
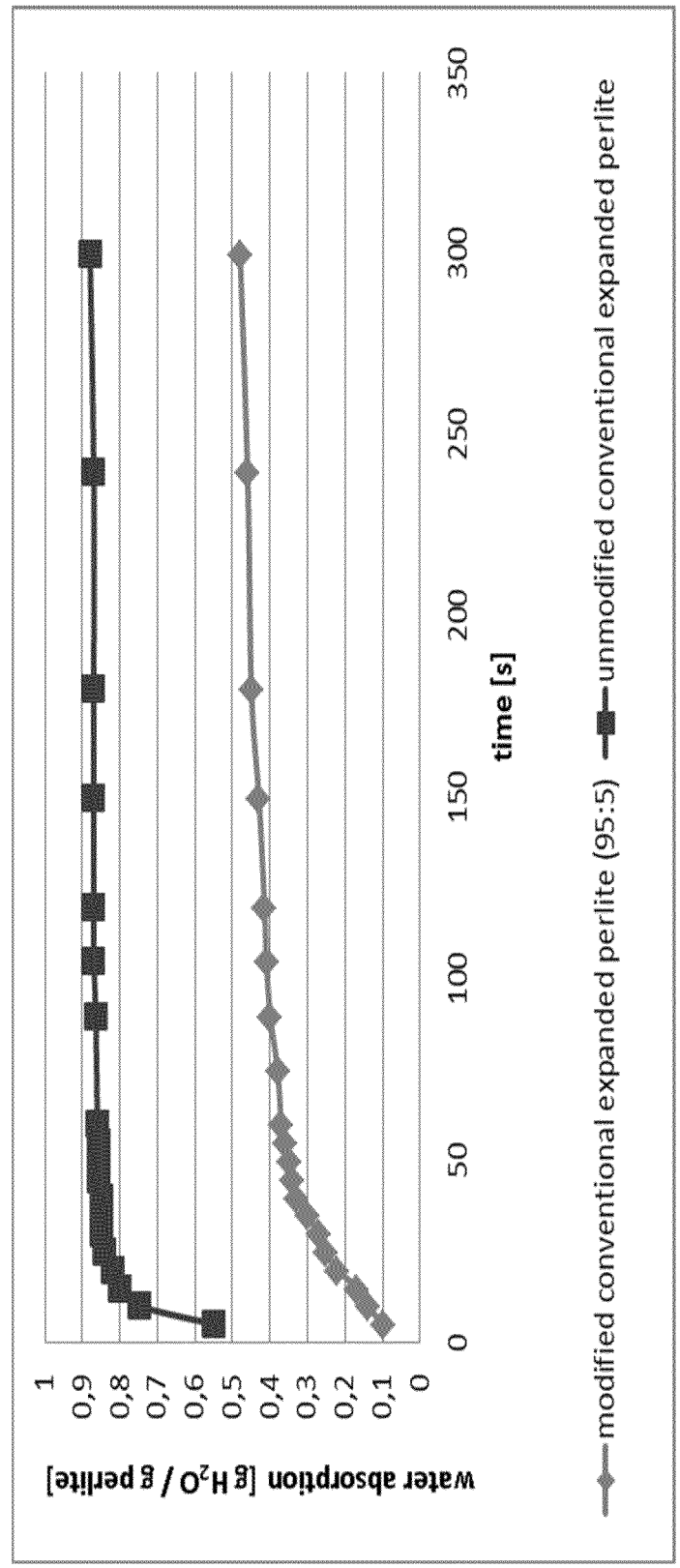

FIG. 10 illustrates water absorption capabilities for modified conventionally expanded perlite (95:5) and unmodified conventionally expanded perlite, ref. example 4b.

Figure 11:
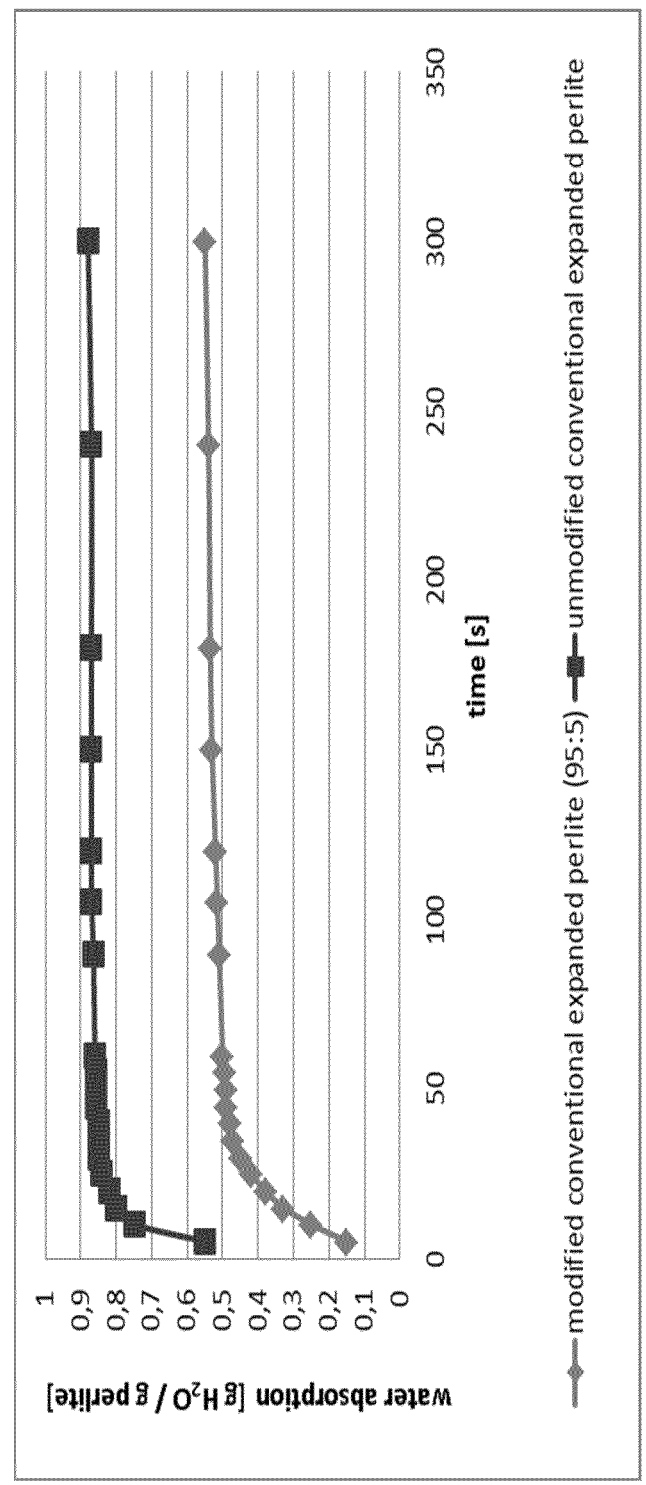

FIG. 11 illustrates water absorption capabilities for modified conventionally expanded perlite (95:5) and unmodified conventionally expanded perlite, ref. example 5c.

Figure 12:
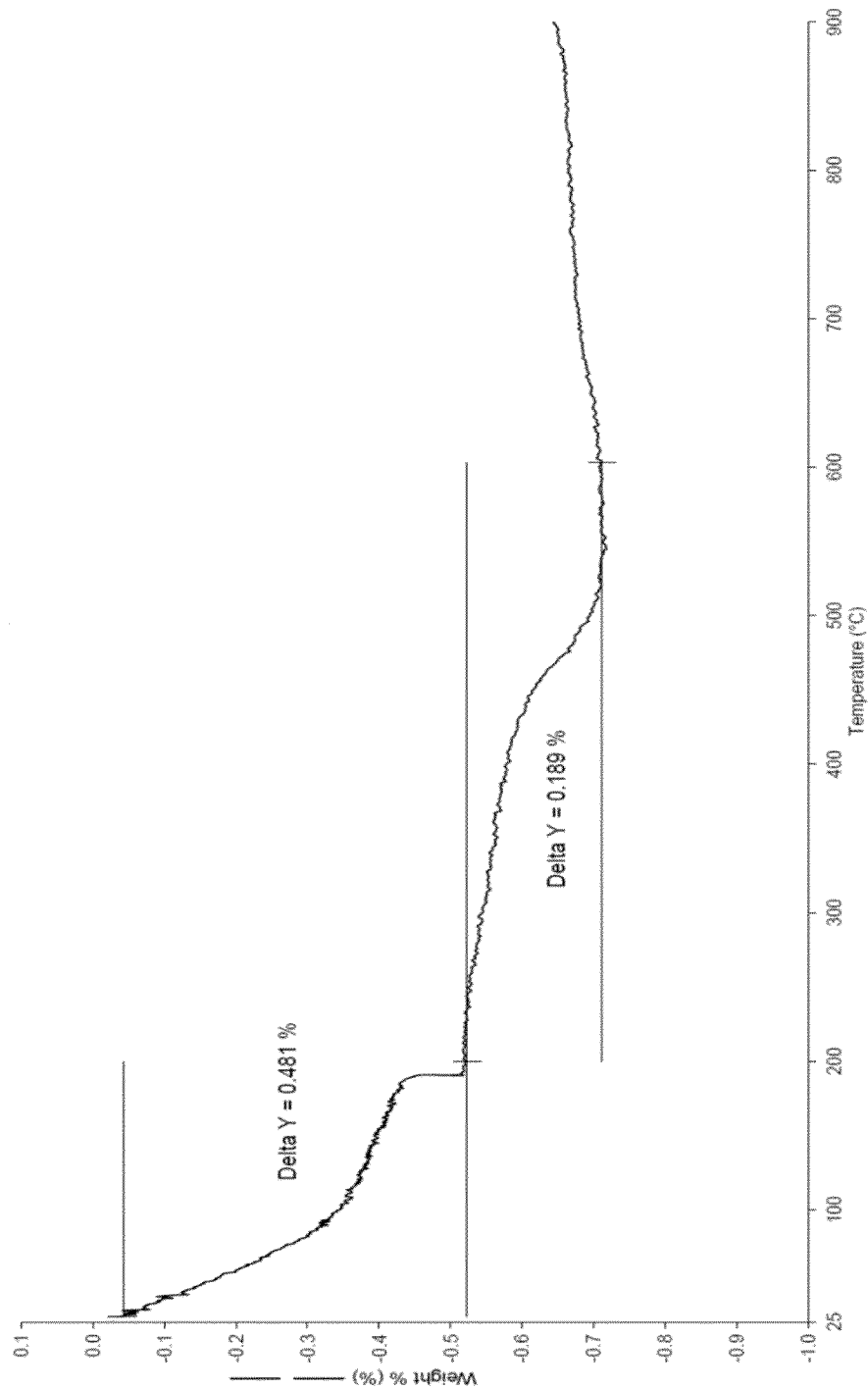

FIG. 12 illustrates the mass loss as a function of temperature for surface-treated lightweight expanded clay aggregates compared to unmodified lightweight expanded clay aggregates.

DETAILED DESCRIPTION OF THE INVENTION

Before the present invention is disclosed and described, it is to be understood that this invention is not limited to the particular structures, process steps, or materials disclosed to herein, but is extended to equivalents thereof as would be recognized by those ordinarily skilled in the relevant arts. It should also be understood that terminology employed herein is used for the purpose of describing particular embodiments only and is not intended to be limiting.

It is an object of the invention to provide particulate inorganic material with reduced ability to absorb water and improved mechanical strength compared to known particulate inorganic materials.

It is a further object to provide a particulate inorganic material which upon admixture with construction materials, such as mortar, plaster, cement and lightweight concrete, or introduced as additive in such construction materials provides the mixture with long lasting improved mechanical strength.

The above mentioned objects have been achieved by means of a surface-treated particulate inorganic material prepared by a method comprising or consisting of the following steps:

providing a particulate inorganic material; and bringing the particulate inorganic material into contact with a composition comprising or consisting of at least one surface treating agent and thereby obtain a surface-treated particulate inorganic material;

wherein the at least one surface treating agent is an organic-inorganic hybrid polymer;

the organic-inorganic hybrid polymer being selected from the group of polymers obtainable by a process comprising or consisting of the following step(s):

a) forming a polymer by controlled hydrolysis and condensation of one type of silane selected from the group of silanes represented by the following general formula: $(X\text{-}L\text{-})_n Si(\text{---}Y)_{4-n}$; or forming a polymer by controlled hydrolysis and condensation of at least two different types of silanes independently selected from the group of silanes represented by the following general formula: $(X\text{-}L\text{-})_n Si(\text{---}Y)_{4-n}$;

wherein

X is $\text{---}NR_1R_2$, $\text{---}N\text{=}C\text{=}O$, SH or OH $R_1$ and $R_2$ are residues independently selected from the group consisting of hydrogen; non-substituted or substituted, saturated or unsaturated $C_1\text{-}C_{25}$ hydrocarbon radical which may be straight, branched or cyclic; aliphatic or aromatic carbonyl; and substituted or non-substituted aryl; wherein the carbon chains of said residues optionally can include one or more of the elements oxygen, nitrogen, sulphur, phosphorous, silicon or boron; or $R_1$ and $R_2$ are independently selected from the group consisting of condensation products, addition products of one or more type of chemical substances such as acids, alcohols, phenols, amines, aldehydes or epoxides;

n is 1 or 2;

L is a direct bond; or a residue selected from the group consisting of non-substituted or substituted, saturated or unsaturated $C_1\text{-}C_{25}$ hydrocarbon radical which may be straight, branched or cyclic; and substituted or non-substituted arylene; wherein the carbon chains of said residues optionally can include one or more of the elements oxygen, nitrogen, sulphur, phosphorous, silicon or boron; and Y is a hydrolysable group or OH;

and b) if X is $\text{---}NR_1R_2$ and at least one of $R_1$ and $R_2$ is H for the selected silane(s) or for at least one of the selected silanes;

or X is $\text{---}N\text{=}C\text{=}O$, SH or OH for the selected silane(s) or for at least one of the selected silanes adding at least one reactant capable of forming a covalent bond between an atom of the X group and at least one atom of the reactant;

the at least one reactant being a compound selected from the group is consisting of cyclic anhydride and a compound of formula R—Z, wherein R is a residue selected from the group consisting of a non-substituted or substituted, saturated or unsaturated $C_1\text{-}C_{25}$ hydrocarbon radical which may be straight, branched or cyclic; aliphatic or aromatic carbonyl; and substituted or non-substituted aryl; wherein the carbon chains of said residues optionally can include one or more of the elements oxygen, nitrogen, sulphur, phosphorous, silicon or boron; or a residue selected from the group consisting of condensation products, addition products of one or more type of chemical substances such as acids, alcohols, phenols, amines, aldehydes or epoxides; and Z is a residue selected from the group consisting of alkoxyl, aryloxyl, cycloalkoxyl, carboxyl, formyl, acyl halide, isocyanate, hydroxyl, amine, epoxide, ester and halogen;

and c) if X is $\text{---}NR_1R_2$ for the selected silane(s) or for at least one of the selected silanes optionally, adding an acid that is capable of converting the N-atom of the X group to quaternary nitronium ions.

The term "one type of silane selected from the group of silanes represented by the following general formula: $(X\text{-}L\text{-})_n Si(\text{---}Y)_{4-n}$" is herein meant to refer to one specific silane selected from a list of silanes, wherein each and one of the silanes in the list is represented by the following general formula: $(X\text{-}L\text{-})_n Si(\text{---}Y)_{4-n}$. An example of one type of silane selected from the group of silanes represented by the following general formula: $(X\text{-}L\text{-})_n Si(\text{---}Y)_{4-n}$ is $(NH_2\text{---}CH_2\text{---}CH_2\text{---}CH_2\text{-})_1 Si(\text{---}O\text{---}CH_2\text{---}CH_3)_3$. Forming a polymer by controlled hydrolysis and condensation of one type of silane results in the formation of a homopolymer.

If the polymer obtained in process step a) is a homopolymer, step b) and c) refer to "for the selected silane" instead of "for the selected silane(s) or for at least one of the selected silanes".

The term "at least two different types of silanes independently selected from the group of silanes represented by the following general formula: $(X\text{-}L\text{-})_n Si(\text{---}Y)_{4-n}$" is herein meant to refer to two or more unique silanes selected from a list of silanes, wherein each and one of the silanes in the list is represented by the following general formula: $(X\text{-}L\text{-})_n Si(\text{---}Y)_{4-n}$. The term "unique silanes" is herein meant to refer to silanes that are not identical in structure, i.e. that each and one of the two or more silanes has a unique structure. An example of two different types of silanes independently selected from the group of silanes represented by the following general formula: $(X\text{-}L\text{-})_n Si(\text{---}Y)_{4-n}$ is $(NH_2\text{---}CH_2\text{---}CH_2\text{---}CH_2\text{-})_1 Si(\text{---}O\text{---}CH_2\text{---}CH_3)_3$ and $(NH_2\text{---}CH_2\text{---}CH_2\text{---}CH_2\text{-})_2 Si(\text{---}O\text{---}CH_2\text{---}CH_3)_2$. Forming a polymer by controlled hydrolysis and condensation of at least two different types of silanes results in the formation of a copolymer.

If the polymer obtained in step a) is a copolymer, step b) and c) refer to "for the selected silanes or for at least one of the selected silanes" instead of "for the selected silane(s) or for at least one of the selected silanes".

The term "if X is $\text{---}NR_1R_2$ and at least one of $R_1$ and $R_2$ is H for the selected silanes" in step b) requires that each and all of the monomers which constitute the polymeric chain has $X\text{=}\text{---}NR_1R_2$ and at least one of $R_1$ and $R_2$ is H. The term "if X is $\text{---}NR_1R_2$ and at least one of $R_1$ and $R_2$ is H for at least one of the selected silanes" in step b) requires that at least one of the monomers which constitute the polymeric chain has $X\text{=}\text{---}NR_1R_2$ and at least one of $R_1$ and $R_2$ is H.

The term "if X is —N═C═O, SH or OH for the selected silanes" in step b) requires that each and all of the monomers which constitute the polymeric chain has X═—N═C═O, SH or OH. The term "if X is —N═C═O, SH or OH for at least one of the selected silanes" in step b) requires that at least one of the monomers which constitute the polymeric chain has X═—N═C═O, SH or OH.

The term "if X is —NR$_1$R$_2$ for the selected silanes" in step c) requires that each and all of the monomers which constitute the polymeric chain has X═—NR$_1$R$_2$. The term "if X is —NR$_1$R$_2$ for at least one of the selected silanes" in step c) requires that at least one of the monomers which constitute the polymeric chain has X═—NR$_1$R$_2$.

The method according to present invention is not dependent upon a certain type of reaction medium and may be conducted in both aqueous, such as water, and organic based dispersion agents.

Manufacturing the Surface-Treated Particulate Inorganic Material

The first step in the process of manufacturing the surface-treated particulate inorganic material according to the present invention involves providing a particulate inorganic material. The term "particulate material" is herein intended to include any material in particulate form. Whether the material is in the form of one single particle or a plurality of particles, it is still a particulate material. The term "inorganic material" refers to a material that is not organic.

Particulate Inorganic Material

In one embodiment according to the present invention, the particulate inorganic material is selected from the group consisting of perlite, expanded perlite, bentonite, diatomite, silica, barite, gypsum, limestone, kaolin, clay, expanded clay, biochar, mica, talc, vermiculite, synthetic calcium silicate hydrate, natural silicates, volcanic ash and other volcanic products such as fly ash and glass, slag, pumice, shale, synthetic silicates, alumino silicates, diatomaceous earth, wollastonite, slate, expanded slate; or any mixture thereof.

In another embodiment according to the present invention, the particulate inorganic material is expanded perlite, expanded clay, expanded slate or any mixture thereof. Preferably, the particulate inorganic material is expanded perlite. More preferably the particulate inorganic material is conventionally expanded perlite or thermally expanded perlite. Conventionally expanded perlite and thermally expanded perlite are specifically referred to in examples 2b and 2a respectively. Expanded clay is specifically referred to in examples 7 and 8.

Methods for expanding perlite, clay and other particulate inorganic materials are well known in the art and should therefore not need to be thoroughly discussed herein.

Reference is made to the following publications disclosing methods for producing conventionally expanded perlite:

J. E. Kogel, N.C. Trivedi, J. M. Barker, S. T. Krukowski: Perlite, by J. M. Barker and K. Santini. Industrial Minerals and Rocks, 7th edition, 2006, pp. 685-702;

U.S. Department of the Interior, Bureau of Mines, Washington. Perlite: US Minerals Yearbook 1989, Vol. I: Metals and Minerals, pp. 765-767;

M. Roulia, K. Chassapis, A. Kapoutsis, E. I. Kamitsos, T. Savvidis: Influence of thermal treatment on the water realise and the glassy structure of perlite. J. Marer Sci, 2006, Vol. 41, pp. 5870-5881;

Av. A. Varuzhanyan, Ar. A. Varuzhanyan, H. A. Varuzhanyan: A mechanism of perlite expansion. Inorganic Materials, ISSN 0020-1685, 2006, Vol. 42 (9), pp. 1039-1045; and U.S. Pat. No. 4,525,388 "Process for expanding and coating perlite".

Reference is made to the following publications disclosing methods for producing thermally expanded perlite:

Peppas, M. Taxiarchou, E. Koffa, T. Karalis, A. Amanatidis, Development of closed porous microcellular products from perlite. AMIREG 2006 Conference, September 206, Hania, Greece;

K. Zahringer: Etude thermohydraulique du phenomene d'expansion de la perlite: Applications a un four industriel. PhD Thesis, Ecole Centrale Paris (1998); and "Milled expanded volcanic glass as lamellar filler", EP 2 444 460 A1 Reference is made to the following publication disclosing methods for producing expanded perlite by use of indirect heating technology:

"Expanded, micronized surface treated Aluminosilicate volcanic glass as lamellar functional filler for Plastics and Special coatings", WO 2015/057895.

Reference is made to the following publication disclosing methods for producing expanded perlite by use of microwave technology:

"Method for the rapid thermal treatment of glass and glass-like materials using microwave radiation", U.S. Pat. No. 6,408,649 (2002).

In another embodiment according to the present invention, the particulate inorganic material is a lightweight particulate inorganic material. Examples of lightweight particulate inorganic materials are particulate inorganic materials having a lbd less than 950 kg/m$^3$; preferably a lbd of 10-950 kg/m$^3$, such as a lbd of 10-800 kg/m$^3$, 10-600 kg/m$^3$, 10-500 kg/m$^3$ or 10-400 kg/m$^3$; more preferably a lbd of 10-350 kg/m$^3$, such as a lbd of 30-350 kg/m$^3$, 30-300 kg/m$^3$ or 30-100 kg/m$^3$. Further examples of lightweight particulate inorganic materials are particulate inorganic materials having an effective particle density less than 950 kg/m$^3$; preferably an effective particle density of 10-950 kg/m$^3$, such as 10-800 kg/m$^3$, 10-600 kg/m$^3$, 10-500 kg/m$^3$ or 10-400 kg/m$^3$; more preferably an effective particle density of 10-350 kg/m$^3$, such as 30-350 kg/m$^3$, 30-300 kg/m$^3$ or 30-100 kg/m$^3$.

Loose bulk density (lbd) is herein measured in accordance with: BS EN 1097-3:1998 "Tests for mechanical and physical properties of aggregates. Determination of loose bulk density and voids"

Effective particle density is herein measured in accordance with: EN1097-6:2000 "Tests for mechanical and physical properties of aggregates. Determination of particle density and water absorption".

It is to be understood that the particle(s) of the particulate inorganic material according to the present invention may be of different size and shape. In one embodiment according to the present invention, the particle size distribution ($d_{50}$) of the particulate inorganic material is in the range 10 nm-30000 microns. In another embodiment according to the present invention, the particle size distribution ($d_{50}$) of the particulate inorganic material is in the range 10 nm-1000 microns, such as 10 nm-800 microns, 10 nm-600 microns, 10 nm-400 microns, 10 nm-200 microns, 10 nm-100 microns, 10 nm-50 microns or 10 nm-25 microns. In another embodiment according to the present invention, the particle size distribution ($d_{50}$) of the particulate inorganic material is in the range 10 nm-30000 microns.

In another embodiment according to the present invention, the particle size distribution ($d_{50}$) of the particulate inorganic material is in the range 100 nm-30000 microns. In another embodiment according to the present invention, the particle size distribution ($d_{50}$) of the particulate inorganic material is in the range 100 nm-1000 microns, such as 100 nm-800 microns, 100 nm-600 microns, 100 nm-400 microns, 100 nm-200 microns, 100 nm-100 microns, 100 nm-50 microns or 100 nm-25 microns. In another embodiment according to the present invention, the particle size distribution ($d_{50}$) of the particulate inorganic material is in the range 100 nm-30000 microns.

In another embodiment according to the present invention, the particle size distribution ($d_{50}$) of the particulate inorganic material is in the range 2-30000 microns. In another embodiment according to the present invention, the particle size distribution ($d_{50}$) of the particulate inorganic material is in the range 2-1000 microns, such as 2-800 microns, 2-600 microns, 2-400 microns, 2-200 microns, 2-100 microns, 2-50 microns or 2-25 microns.

In another embodiment according to the present invention, the particle size distribution ($d_{50}$) of the particulate inorganic material is in the range 1000-30000 microns, such as 2000-30000 microns, 4000-30000 microns, 6000-30000 microns, 8000-30000 microns or 10000-30000 microns. While the smallest particles typically find use as fillers, extenders and additives in construction materials, such as mortar (FIG. 7, right), plaster, cement and lightweight concrete e.g. for thermal insulation, the larger particles typically finds use e.g. as material for drainage (FIG. 7, middle), material for filtration and as aggregates in blocks (FIG. 7, left).

Particle size distribution ($d_{50}$) is the value of the particle diameter at 50% in the cumulative distribution. Particle size distribution ($d_{50}$) is herein measured in accordance with: EN933-1:1997 "Tests for geometrical properties of aggregates. Determination of particle size distribution. Sieving method". The particle size analyses can be performed with the optical image analysis system Camsizer XT of Retsch.

The second step in the process of manufacturing the surface-treated particulate inorganic material according to the present invention involves bringing the particulate inorganic material into contact with a composition comprising or consisting of at least one surface treating agent. The term "bringing into contact with" as used herein means that the composition comprising at least one surface treating agent is applied to at least part of the surface of the particulate inorganic material or vice a versa. The step of "bringing into contact" can be accomplished e.g. by dipping, spraying, brushing, bath treatment or any combination thereof.

Dipping

In one embodiment according to the present invention, the particulate inorganic material is dipped into the composition comprising at least one surface treating agent, e.g. by filling a tea-bag with the particulate inorganic material to be treated and then immersing the tea-bag into the composition comprising at least one surface treating agent (example 6). The term "tea-bag" refers to a bag or device with pores adapted to prevent the particulate inorganic material to escape from the bag but at the same time allow the composition into which it is immersed to pass freely in and out of the bag. In order to facilitate transport of the composition comprising at least one surface treating agent in and out of the bag, the composition may be subjected to stirring, e.g. magnetic stirring, during treatment or optionally the tea-bag may be immersed in a continuous flow of the composition into which it is immersed. After the bag has been in contact with the composition comprising at least one surface treating agent for a predetermined period of time, the bag and/or its content may be removed from the composition and subjected to one or more washing steps, e.g. by immersion into water or a suitable organic solvent like methanol or ethanol.

After the washing step(s), the particulate inorganic material may optionally be subjected to one or more drying step(s) in order to remove water and/or organic solvents. If a second layer of coating is to be applied, the bag and/or its content may be re-immersed into a composition comprising at least one surface treating agent in order to put on a second layer of coating. Similar procedures may be followed to put on a third, fourth, fifth etc. layer of coatings. After coating and washing, the content in the bag is preferably subjected to one or more drying step(s) in order to remove water and/or organic solvents.

Bath Treatment

In another embodiment according to the present invention, the particulate inorganic material is immersed into the composition comprising at least one surface treating agent (bath treatment), preferably into a continuous flow of the composition comprising at least one surface treating agent, e.g. by introducing the particulate inorganic material into a reactor equipped on both sides with tube connections providing a continuous flow of the composition comprising at least one surface treating agent (example 2a). In order to facilitate mixing of the composition comprising at least one surface treating agent and the particulate inorganic material, the mixture may be subjected to stirring, e.g. magnetic stirring, during treatment or optionally the reactor may be rotating during treatment or the mixture may be circulating through the reactor. After the particulate inorganic material has been in contact with the composition comprising at least one surface treating agent for a predetermined period of time, the particulate inorganic material may be removed from the composition and subjected to one or more washing steps, e.g. by providing a continuous flow of water or a suitable organic solvent like methanol or ethanol. After the washing step(s), the particulate inorganic material may optionally be subjected to one or more drying step(s) in order to remove water and/or organic solvents. If a second layer of coating is to be applied, the particulate inorganic material may be re-immersed into the composition comprising at least one surface treating agent in order to put on a second layer of coating. Similar procedures may be followed to put on a third, fourth, fifth etc. layer of coatings. After coating and washing, the particulate inorganic material is preferably subjected to one or more drying step(s) in order to remove water and/or organic solvents.

Spraying

In another embodiment according to the present invention, the composition comprising at least one surface treating agent is sprayed onto the particulate inorganic material (example 2b and 2c), e.g. by following the procedure disclosed in U.S. Pat. No. 4,525,388 or a fluid bed processor. After a first layer of coating has been sprayed onto the particulate inorganic material, the particulate inorganic material may be subjected to one or more washing steps, e.g. by providing a spray treatment of water or a suitable organic solvent like methanol or ethanol. The particulate inorganic material may optionally be subjected to one or more drying step(s) in order to remove water and/or organic solvents.

Brushing

In another embodiment according to the present invention, the composition comprising at least one surface treating agent is brushed onto the particulate inorganic material. After a first layer of coating has been brushed onto the particulate inorganic material, the particulate inorganic material may be subjected to one or more washing steps, e.g. by immersion into water or a suitable organic solvent like methanol or ethanol. After the washing step(s), the particulate inorganic material may optionally be subjected to one or more drying step(s) in order to remove water and/or organic solvents. If a second layer of coating is to be applied, the particulate inorganic material may be subjected to a second coating step by brushing a second layer of the composition comprising at least one surface treating agent onto the particulate inorganic material. Similar procedures may be followed to put on a third, fourth, fifth etc. layer of coatings. After coating and washing, the particulate inorganic material is preferably subjected to one or more drying step(s) in order to remove water and/or organic solvents.

Number of Layers

In one embodiment according to the present invention, the particulate inorganic material is subjected to one or more washing steps, e.g. by immersion into water or a suitable organic solvent like methanol or ethanol, after having been brought into contact with the composition comprising at least one surface treating agent for a sufficient period of time. After the washing step(s), the particulate inorganic material may optionally be subjected to one or more drying step(s) in order to remove water and/or organic solvents. If a second layer of coating is to be applied, the particulate inorganic material is typically brought into contact with a composition comprising at least one surface treating agent in order to put on a second layer of coating. Similar procedures may be followed to put on a third, fourth, fifth etc. layer of coatings. After coating and washing step(s), the particulate inorganic material is preferably subjected to one or more drying step(s) in order to remove water and/or organic solvents.

In the context of the present invention, the number of layers refers to the number of times the particulate inorganic material has been brought into contact with the composition comprising at least one surface treating agent. One or more washing step(s) or at least one drying step need to be performed between each coating treatment in order for the result of each coating treatment to be referred to as a new layer. The purpose of the washing and drying steps is to remove solvents such as water, ethanol and methanol.

If two or more layers of coating are to be applied onto the particulate inorganic material, it is to be understood that each layer may be applied using the same or different technique, e.g. the first layer may be applied by spraying and the second layer may be applied by bath treatment or the other way around. Similarly, if the first, second and third layers are applied by bath treatment, the fourth layer may be applied by spraying and the fifth layer applied by e.g. dipping.

In one embodiment according to the present invention, one or more layers of the composition comprising at least one surface treating agent has been applied onto the particulate inorganic material, such as e.g. one layer, at least two layers, at least three layers, at least four layers, at least five layers, at least six layers, at least seven layers, at least eight layers, at least nine layers or at least ten layers. In another embodiment according to the present invention the number of layers of the composition comprising at least one surface treating agent that has been applied onto the particulate inorganic material is in the range 1 to 100, 1 to 50, 1 to 25, 1 to 10, 1 to 8, 1 to 6, 1 to 4 or 1 to 2.

Viscosity

When the particulate inorganic material is brought into contact with the composition comprising at least one surface treating agent, the composition comprising at least one surface treating agent will adhere, either covalently or non-covalently, to the surface of the particulate inorganic material. In order for the at least one surface treating agent to come into contact with as much of the particle surface as possible, it is favorable that the composition comprising at least one surface treating agent is able to penetrate any cracks and fissures that may be present on the surface and is able to enter into any interior air filled cavities.

In one embodiment according to the present invention, the particulate inorganic material to be surface treated is exposed to water or a suitable organic solvent, such as methanol or ethanol, prior to bringing the particulate inorganic material into contact with a composition comprising at least one surface treating agent in order to enable best wetting properties.

In another embodiment according to the present invention, the viscosity of the composition comprising at least one surface treating agent is sufficiently low to allow for the surface treating agent(s) to come into contact with as much of the particle surface as possible. The temperature of the composition and the concentration of the surface treating agent(s) are known to be important parameters for the viscosity of the composition comprising at least one surface treating agent.

In one embodiment according to the present invention, the composition comprising at least one surface treating agent contains 0.01 to 20 wt % of the at least one surface treating agent, such as e.g. 0.05 to 20 wt % of the at least one surface treating agent, 0.1 to 20 wt % of the at least one surface treating agent, 0.5 to 20 wt % of the at least one surface treating agent, 1 to 20 wt % of the at least one surface treating agent, 2 to 20 wt % of the at least one surface treating agent, 5 to 20 wt % of the at least one surface treating agent, 2 to 15 wt % of the at least one surface treating agent, 2 to 12 wt % of the at least one surface treating agent, 2 to 10 wt % of the at least one surface treating agent or 5 to 10 wt % of the at least one surface treating agent. The term "the at least one surface treating agent" is herein intended to refer to the organic-inorganic hybrid polymer defined according to the first aspect of the present invention.

In another embodiment according to the present invention, the composition comprising at least one surface treating agent contains 0.01 to 20 wt % of surface treating agents, such as e.g. 0.05 to 20 wt % of surface treating agents, 0.1 to 20 wt % of surface treating agents, 0.5 to 20 wt % of surface treating agents, 1 to 20 wt % of surface treating agents, 2 to 20 wt % of surface treating agents, 5 to 20 wt % of surface treating agents, 2 to 15 wt % of surface treating agents, 2 to 12 wt % of surface treating agents, 2 to 10 wt % of surface treating agents or 5 to 10 wt % of surface treating agents. The term "surface treating agents" is herein intended to refer to all compounds that are intended to adhere to the particulate inorganic material, i.e the organic-inorganic hybrid polymer defined according to the first aspect of the present invention and all other compounds in the composition which are intended to adhere to the particulate inorganic material.

In one embodiment according to the present invention, the composition comprising at least one surface treating agent is heated to a temperature in the range 5° C. to 300° C., such as e.g. 10° C. to 300° C., 10° C. to 200° C., 10° C. to 150° C., 15° C. to 300° C., 15° C. to 200° C., 15° C. to 150° C., 20° C. to 300° C., 20° C. to 200° C., 20° C. to 150° C., 25° C. to 300° C., 25° C. to 200° C., 25° C. to 150° C., 30° C. to 300° C., 30° C. to 200° C., 30° C. to 150° C., 35° C. to 300° C., 35° C. to 200° C., 35° C. to 150° C., 40° C. to 300° C., 40° C. to 200° C. or 40° C. to 150° C. prior to being brought into contact with the particulate inorganic material.

In another embodiment according to the present invention, the composition comprising at least one surface treating agent has a temperature in the range 5° C. to 300° C., such as e.g 10° C. to 300° C., 10° C. to 200° C., 10° C. to 150° C., 15° C. to 300° C., 15° C. to 200° C., 15° C. to 150° C., 20° C. to 300° C., 20° C. to 200° C., 20° C. to 150° C., 25° C. to 300° C., 25° C. to 200° C., 25° C. to 150° C., 30° C. to 300° C., 30° C. to 200° C., 30° C. to 150° C., 35° C. to 300° C., 35° C. to 200° C., 35° C. to 150° C., 40° C. to 300° C., 40° C. to 200° C. or 40° C. to 150° C. when being to brought into contact with the particulate inorganic material.

Even though it may be preferred that the composition comprising at least one surface treating agent is heated prior to being brought into contact with the particulate inorganic material, it is essential that the composition comprising at least one surface treating agent is not heated to a temperature which would decompose the structure of the polymer obtained in step a) to step c).

Thus, in one embodiment according to the present invention, the polymer obtained by process steps a) to c) is not subjected to heat treatment which would decompose the hydrophobic surface of the polymer, i.e. decompose the hydrophobic surface provided by the X-group. The temperature at which the hydrophobic surface starts to decompose will vary depending on the structure of the X-group. A man skilled in the art will easily be able to determine at what temperature the hydrophobic surface starts to decompose, e.g. by thermogravimetric analysis (TGA). The polymer obtained by process steps a) to c) is preferably not subjected to temperatures higher than the temperature at which the hydrophobic surface starts to decompose.

In another embodiment according to the present invention, the surface-treated particulate inorganic material is not subjected to heat treatment which would decompose the hydrophobic surface of the polymer which is attached to the particulate inorganic material, i.e. decompose the hydrophobic surface provided by the X-group. The temperature at which the hydrophobic surface starts to decompose will vary depending on the structure of the X-group. A man skilled in the art will easily be able to determine at what temperature the hydrophobic surface starts to decompose, e.g. by thermogravimetric analysis (TGA). The surface-treated particulate inorganic material is preferably not subjected to temperatures higher than the temperature at which the hydrophobic surface of the polymer which is attached to the particulate inorganic material starts to decompose.

An example of a typical thermogravimetric analysis is referred to below.

In one embodiment according to the present invention, the surface-treated particulate inorganic material is not subjected to calcination.

In another embodiment according to the present invention, the surface-treated to particulate inorganic material and/or the polymer obtained by process steps a) to c) is not subjected to heat treatment at temperatures above 100° C. In another embodiment according to the present invention, the surface-treated particulate inorganic material and/or the polymer obtained by process steps a) to c) is not subjected to heat treatment at temperatures above 150° C. In another embodiment according to the present invention, the surface-treated particulate inorganic material and/or the polymer obtained by process steps a) to c) is not subjected to heat treatment at temperatures above 200° C. In another embodiment according to the present invention, the surface-treated particulate inorganic material and/or the polymer obtained by process steps a) to c) is not subjected to heat treatment at temperatures above 250° C. In another embodiment according to the present invention, the surface-treated particulate inorganic material and/or the polymer obtained by process steps a) to c) is not subjected to heat treatment at temperatures above 300° C. In another embodiment according to the present invention, the surface-treated particulate inorganic material and/or the polymer obtained by process steps a) to c) is not subjected to heat treatment at temperatures above 350° C. In another embodiment according to the present invention, the surface-treated particulate inorganic material and/or the polymer obtained by process steps a) to c) is not subjected to heat treatment at temperatures above 400° C. In another embodiment according to the present invention, the surface-treated particulate inorganic material and/or the polymer obtained by process steps a) to c) is not subjected to heat treatment at temperatures above 450° C. In another embodiment according to the present invention, the surface-treated particulate inorganic material and/or the polymer obtained by process steps a) to c) is not subjected to heat treatment at temperatures above 499° C. In another embodiment according to the present invention, the surface-treated particulate inorganic material and/or the polymer obtained by process steps a) to c) is not subjected to heat treatment at temperatures above 500° C.

In one embodiment according to the present invention, the organic-inorganic hybrid polymer prepared by step a) to c) is not covalently attached to other polymers that have an average particle diameter that is less than 80%, such as less than 70%, less than 60%, less than 50% or less than 40% of the average particle diameter of the at least one surface treating agent. Preferably, the organic-inorganic hybrid polymer which has been brought into contact with the particulate inorganic material is not covalently attached to other polymers that have an average particle diameter that is less than 80%, such as less than 70%, less than 60%, less than 50% or less than 40% of the average particle diameter of the at least one surface treating agent.

Amount of Surface Treating Agent Deposited on the Particulate Inorganic Material In one embodiment according to the present invention, the particulate inorganic material is subjected to one or more washing steps, e.g. by immersion into water or a suitable organic solvent like methanol or ethanol, after having been brought into contact with the composition comprising at least one surface treating agent for a sufficient period of time. After the washing step(s), the particulate inorganic material may optionally be subjected to one or more drying step(s) in order to remove water and/or organic solvents. If a second layer of coating is to be applied, the particulate inorganic material may then be brought into contact with the composition comprising at least one surface treating agent in order to put on a second layer of coating. Similar procedures may be followed to put on a third, fourth, fifth etc. layer of coatings. After coating and optionally washing and drying step(s), the particulate inorganic material is preferably subjected to one or more drying step(s) in order to remove water and/or organic solvents. The coated particulate inorganic material may then be subjected to thermogravimetric analysis (TGA) in order to investigate the actual amount of organic moieties, in particular the amount of surface treating agent, deposited on the particulate inorganic material.

A thermogravimetric analysis typically involves:

heat treatment from a low temperature, such as a temperature in the range 20-40° C., to a higher temperature, such as a temperature in the range 150-250° C., at 10-30° C./minute under inert atmosphere, such as $N_2$ atmosphere;

heat treatment at a relatively high temperature, such as a temperature of 150-250° C., for a prolonged period of time, such as 30 to 90 minutes;

heat treatment from a relatively high temperature, such as a temperature of 150-250° C., to a higher temperature, such as a temperature in the range 700-1100° C., at 10-30° C./minute under inert atmosphere, such as N$_2$ atmosphere.

Organic moieties will be oxidised during the above heat treatment. By measuring the mass loss during heat treatment, the amount of organic moieties, in particular the amount of surface treating agent, deposited on the particulate inorganic material may be measured.

In one embodiment according to the present invention, the ratio of particulate inorganic material:the at least one surface treating agent is in the range 99.9:0.1 pbw (parts by weight) to 20:80 pbw. In another embodiment, the ratio of particulate inorganic material:the at least one surface treating agent is in the range 99:1 pbw to 20:80 pbw, such as 99:1 pbw to 30:70 pbw, 99:1 pbw to 40:60 pbw, 99:1 pbw to 50:50 pbw, 99:1 pbw to 60:40 pbw, 99:1 pbw to 70:30 pbw, 99:1 pbw to 80:20 pbw, 99:1 pbw to 90:10 pbw.

In another embodiment, the ratio of particulate inorganic material:the at least one surface treating agent is in the range 99:1 pbw to 70:30 pbw, such as in the range 99:1 pbw to 75:25 pbw, in the range 99:1 pbw to 80:20 pbw, in the range 99:1 pbw to 85:15 pbw, in the range 99:1 pbw to 90:10 pbw, in the range 99:1 pbw to 92:8 pbw, in the range 99:1 pbw to 95:5 pbw, in the range 99:1 pbw to 98:2 pbw. The ratio being measured based on the mass loss when the coated particulate material is subjected to a thermogravimetric analysis like was done in example 2a, 2b and 2c section iv.

The term "surface treating agents" is herein intended to refer to all compounds that are intended to adhere to the particulate inorganic material, i.e. the organic-inorganic hybrid polymer defined according to the first aspect of the present invention and all other surface treating agents that are present in the composition comprising at least one surface treating agent.

In one embodiment according to the present invention, the composition comprising at least one surface treating agent does not contain polymers that have an average particle diameter that is less than 80%, such as less than 70%, less than 60%, less than 50% or less than 40% of the average particle diameter of the at least one surface treating agent.

Manufacturing Organic-Inorganic Hybrid Polymer

Organic-inorganic hybrid polymers in general and processes for manufacturing the same have been thoroughly disclosed in the prior art and is therefore in general not unique to the present invention, see e.g. WO0208343 and WO2005/100450 disclosing methods for the preparation of polybranched organic/inorganic hybrid polymers.

The at least one surface treating agent according to the present invention is an organic-inorganic hybrid polymer selected from the group of polymers obtainable by a process comprising the following step(s):

a) forming a polymer by controlled hydrolysis and condensation of one type of silane selected from the group of silanes represented by the following general formula: (X-L-)$_n$ Si(—Y)$_{4-n}$; or forming a polymer by controlled hydrolysis and condensation of at least two different types of silanes independently selected from the group of silanes represented by the following general formula: (X-L-)$_n$ Si(—Y)$_{4-n}$;

wherein

X is —NR$_1$R$_2$, —N=C=O, SH or OH

R$_1$ and R$_2$ are residues independently selected from the group consisting of hydrogen; non-substituted or substituted, saturated or unsaturated C$_1$-C$_{25}$ hydrocarbon radical which may be straight, branched or cyclic; aliphatic or aromatic carbonyl; and substituted or non-substituted aryl; wherein the carbon chains of said residues optionally can include one or more of the elements oxygen, nitrogen, sulphur, phosphorous, silicon or boron; or R$_1$ and R$_2$ are independently selected from the group consisting of condensation products, addition products of one or more type of chemical substances such as acids, alcohols, phenols, amines, aldehydes or epoxides;

n is 1 or 2;

L is a direct bond; or a residue selected from the group consisting of non-substituted or substituted, saturated or unsaturated C$_1$-C$_{25}$ hydrocarbon radical which may be straight, branched or cyclic; and substituted or non-substituted arylene; wherein the carbon chains of said residues optionally can include one or more of the elements oxygen, nitrogen, sulphur, phosphorous, silicon or boron; and Y is a hydrolysable group or OH;

and b) if X is —NR$_1$R$_2$ and at least one of R$_1$ and R$_2$ is H for the selected silane(s) or for at least one of the selected silanes; or X is —N=C=O, SH or OH for the selected silane(s) or for at least one of the selected silanes adding at least one reactant capable of forming a covalent bond between an atom of the X group and at least one atom of the reactant;

the at least one reactant being a compound selected from the group consisting of cyclic anhydride and a compound of formula R—Z, wherein R is a residue selected from the group consisting of a non-substituted or substituted, saturated or unsaturated C$_1$-C$_{25}$ hydrocarbon radical which may be straight, branched or cyclic; aliphatic or aromatic carbonyl; and substituted or non-substituted aryl; wherein the carbon chains of said residues optionally can include one or more of the elements oxygen, nitrogen, sulphur, phosphorous, silicon or boron; or a residue selected from the group consisting of condensation products, addition products of one or more type of chemical substances such as acids, alcohols, phenols, amines, aldehydes or epoxides; and Z is a residue selected from the group consisting of alkoxyl, aryloxyl, cycloalkoxyl, carboxyl, formyl, acyl halide, isocyanate, hydroxyl, amine, epoxide, ester and halogen;

and c) if X is —NR$_1$R$_2$ for the selected silane(s) or for at least one of the selected silanes optionally, adding an acid that is capable of converting the N-atom of the X group to quaternary nitronium ions.

The at least one surface treating agent is selected from the group consisting of polymers obtainable by process steps a) to c). There are a number of different homopolymers that is obtainable by process steps a) to c), each being made by linking only one type of monomer together. However, if monomers from two or more different homopolymers are joined in the same polymer chain, the polymer is called a copolymer. Thus, the term "copolymer" is intended to refer to polymers made by linking monomers from two or more different homopolymers together, i.e. by linking two or more different monomers together in the same polymer chain.

Copolymer

When a polymer is made by linking only one type of monomer together it is called a homopolymer. However, when two or more different types of monomers are joined in the same polymer chain, the polymer is called a copolymer.

In one embodiment according to the present invention, the at least one surface treating agent is a homopolymer. In another embodiment according to the present invention, the at least one surface treating agent is a copolymer.

In one embodiment according to the present invention, the at least one surface treating agent is a copolymer and the copolymer is composed of 2-10 different monomers, preferably 2-8 different monomers, more preferably 2-6 different monomers and most preferably 2-4, such as 2, different monomers. The term "different monomers" refers to monomers that are different in structure.

In one embodiment according to the invention, the at least one surface treating agent is a homopolymer obtainable by controlled hydrolysis and condensation of one type of silane selected from the group of silanes represented by the following general formula: $(X-L-)_n Si(-Y)_{4-n}$. In another embodiment according to the present invention, the at least one surface treating agent is a copolymer obtainable by controlled hydrolysis and condensation of at least two different types of silanes independently selected from the group of silanes represented by the following general formula: $(X-L-)_n Si(-Y)_{4-n}$.

In one embodiment, the at least two different types of silanes is two different types of silanes. In another embodiment according to the present invention, the at least two different types of silanes is three different types of silanes. In another embodiment according to the present invention, the at least two different types of silanes is four different types of silanes. In another embodiment according to the present invention, the at least two different types of silanes is five different types of silanes. In another embodiment according to the present invention, the at least two different types of silanes is six different types of silanes. In another embodiment according to the present invention, the at least two different types of silanes is seven different types of silanes. In another embodiment according to the present invention, the at least two different types of silanes is eight different types of silanes. In another embodiment according to the present invention, the at least two different types of silanes is nine different types of silanes. In another embodiment according to the present invention, the at least two different types of silanes is ten different types of silanes.

When two or more monomers are arranged in an alternating fashion, the polymer is referred to as an alternating copolymer, e.g. -A-B-A-B-A-B-A-B-. In one embodiment according to the present invention, the at least one surface treating agent is an alternating copolymer.

In a random polymer, the at least two monomers may follow in random order, e.g. -A-A-A-B-B-A-B-B-. In one embodiment according to the present invention, the at least one surface treating agent is a random polymer.

In a block copolymer, all of one type of monomer are grouped together and all of the other are grouped together, e.g. -A-A-A-A-B-B-B-B-. A block polymer may be thought of as two homopolymers joined together at the ends. In one embodiment according to the present invention, the at least one surface treating agent is a block polymer.

Controlled Hydrolysis and Condensation of a Silane

By "controlled hydrolysis and condensation" is herein meant hydrolysis and condensation of a suitable silane compound. The first step is typically hydrolysis of a suitable silane compound, such as $R'-Si(OR)_3$, wherein the group R' does not participate in the hydrolysis or condensation reactions. The hydrolysable groups, illustrated by alkoxy groups, are replaced by hydroxyl groups: Si-OR+H-OH→Si-OH+ROH. A controlled amount of water and a controlled amount of glycol based solvent is typically added during this step. The reaction temperature and the reaction time are also controlled.

The second step is condensation in which the hydroxyl group can react with hydroxyl groups or alkoxy groups from other silicon centers and form Si-O-Si bonds and water or alcohol respectively: Si-OH+OH-Si→Si-O-Si+$H_2O$; or Si-OR+HO-Si→Si-O-Si+ROH.

Size of the Organic-Inorganic Hybrid Polymer

To manufacture particles of a certain size it is required to establish chemical conditions that ensure a correct balance between the kinetics of the two reactions, namely condensation and hydrolysis. While the condensation contributes to the formation of polymer chains from (single) monomer molecules, the hydrolysis contributes to a polycrystallinic precipitation or oxohydroxide precipitation. The combination of amino-functional silanes and/or isocyanate functional silanes and exchange of alkoxide groups with strong ligands will moderate the hydrolysis reaction, which will ensure that the polymer chains not become too long but remain in the size of oligomers. In practice the particles will be prepared with a size of few nanometers, more typically less than 10 nm.

In one embodiment according to the present invention, the organic-inorganic hybrid polymer is an oligomer. In another embodiment according to the present invention, the organic-inorganic hybrid polymer is composed of 2-1000 monomers, such as 2-500, 2-300 monomers, 2-200 monomers, 2-100 monomers, 2-50 monomers, 2 to 25 monomers, 2 to 20 monomers, 2 to 15 monomers, 2 to 10 monomers, 4-500 monomers, such as 4-300 monomers, 4-200 monomers, 4-100 monomers, 4-50 monomers, 4 to 25 monomers, 4 to 20 monomers, 4 to 15 monomers, 4 to 10 monomers, 6-500 monomers, such as 6-300 monomers, 6-200 monomers, 6-100 monomers, 6-50 monomers, 6 to 25 monomers, 6 to 20 monomers, 6 to 15 monomers, 6 to 10 monomers, 10-500 monomers, such as 10-300 monomers, 10-200 monomers, 10-100 monomers, 10-50 monomers, 10 to 25 monomers, 10 to 20 monomers, 10 to 15 monomers, 8 to 15 monomers, 4 to 15 monomers or 2 to 15 monomers.

In another embodiment according to the present invention, the organic-inorganic hybrid polymer is composed of at least 2 monomers, such as at least 4 monomers, at least 6 monomers, at least 8 monomers, at least 10 monomers, at least 11 monomers, at least 12 monomers, at least 13 monomers, at least 14 monomers or at least 15 monomers.

In one embodiment according to the present invention, the number of Si atoms in the organic-inorganic hybrid polymer is in the range 2 to 1000, 2 to 500, 2 to 300, 2 to 200, 2 to 100, 2 to 50, 2 to 25, 2 to 20, 2 to 15, 2 to 10, 4 to 500, 4 to 300, 4 to 200, 4 to 100, 4 to 50, 4 to 24, 4 to 20, 4 to 15, 4 to 10, 6 to 500, 6 to 300, 6 to 200, 6 to 100, 6 to 50, 6 to 25, 6 to 20, 6 to 15, 6 to 10, 10 to 500, 10 to 300, 10 to 200, 10 to 100, 10 to 50, 10 to 25, 10 to 20, 10 to 15, 8 to 15, 4 to 15 or 2 to 15 monomers.

In another embodiment according to the present invention, the number of Si atoms in the organic-inorganic hybrid polymer is at least 2, such as at least 4, at least 6, at least 8, at least 10, at least 11, at least 12, at least 13, at least 14 or at least 15.

In another embodiment according to the present invention, the organic-inorganic hybrid polymer will have an average particle diameter of 1 nm to 100 nm, such as e.g. 1 nm to 90 nm, 1 nm to 80 nm, 1 nm to 70 nm, 1 nm to 60 nm, 1 nm to 60 nm, 1 nm to 50 nm, 1 nm to 40 nm, 1 nm to 30 nm, 1 nm to 29 nm, 1 nm to 25 nm, 1 nm to 20 nm, 1 nm to 10 nm or 1 nm to 5 nm.

Stabilizer

A suitable stabilizer may be added to the reaction composition to avoid oxidative degradation of reactants and reaction products during hydrolysis and condensation and subsequent modification. The resulting solution is typically comprised of inorganic polymer particles with free amine groups, free isocyanate groups, free SH groups and/or free OH groups dispersed in a solvent.

In one embodiment according to the present invention, a suitable stabilizer is added to the reaction composition to avoid oxidative degradation of reactants and reaction products during hydrolysis and condensation and subsequent modification. Preferably, the suitable stabilizer is added in the first step in the process of manufacturing the at least one surface treating agent. Suitable stabilizers are typically radical scavengers based on hindered amines, one or more antioxidants or a combination of same (Hans Zweifel (ed.), Plastics Additives Handbook, Carl Hanser Verlag, München, (2001), 10-19).

Organic-Inorganic Hybrid Polymer, L-Group, $C_1$-$C_{25}$ Hydrocarbon Radical

In the definition of L, the term "a residue selected from non-substituted or substituted saturated or unsaturated $C_1$-$C_{25}$ hydrocarbon radical which may be straight, branched or cyclic; wherein the carbon chains of said residues optionally can include one or more of the elements oxygen, nitrogen, sulphur, phosphorous, silicon or boron;" refers to a hydrocarbon radical having up to 25 carbon atoms, such as 1-18 carbon atoms, 1-10 carbon atoms or 1-5 carbon atoms, and is intended to include straight, branched and cyclic hydrocarbon radicals;
saturated or unsaturated hydrocarbon radicals; and
non-substituted or substituted hydrocarbon radicals;
wherein the carbon chains of said residues optionally can include one or more of the elements oxygen, nitrogen, sulphur, phosphorous, silicon or boron.

In one embodiment, the non-substituted or substituted saturated or unsaturated $C_1$-$C_{25}$ hydrocarbon radical which may be straight, branched or cyclic is a non-substituted or substituted saturated or unsaturated $C_1$-$C_{25}$, $C_1$-$C_{18}$, $C_1$-$C_{10}$ or $C_1$-$C_5$ hydrocarbon radical which may be straight or branched. In one embodiment, the non-substituted or substituted saturated or unsaturated $C_1$-$C_{25}$ hydrocarbon radical which may be straight, branched or cyclic is a non-substituted or substituted saturated or unsaturated $C_1$-$C_{25}$, $C_1$-$C_{18}$, $C_1$-$C_{10}$ or $C_1$-$C_5$ hydrocarbon radical which is straight. In one embodiment, the non-substituted or substituted saturated or unsaturated $C_1$-$C_{25}$ hydrocarbon radical which may be straight, branched or cyclic is a non-substituted or substituted saturated $C_1$-$C_{25}$, $C_1$-$C_{18}$, $C_1$-$C_{10}$ or $C_1$-$C_5$ hydrocarbon radical which is straight. In one embodiment, the non-substituted or substituted saturated or unsaturated $C_1$-$C_{25}$ hydrocarbon radical which may be straight, branched or cyclic is a non-substituted saturated $C_1$-$C_{25}$, $C_1$-$C_{18}$, $C_1$-$C_{10}$ or $C_1$-$C_5$ hydrocarbon radical which is straight. In another embodiment according to the present invention, the non-substituted or substituted saturated or unsaturated $C_1$-$C_{25}$ hydrocarbon radical which may be straight, branched or cyclic is a radical of the formula —$CH_2$—$CH_2$—$CH_2$— (example 1a, section i; and example 1b, section i).

In one embodiment according to the present invention, L is a residue selected from the group consisting of a non-substituted or substituted saturated or unsaturated $C_1$-$C_{25}$, $C_1$-$C_{18}$, $C_1$-$C_{10}$ or $C_1$-$C_5$ hydrocarbon radical which may be straight, branched or cyclic; wherein the carbon chains of said residues optionally can include one or more of the elements oxygen, nitrogen, sulphur, phosphorous, silicon or boron.

In one embodiment according to the present invention, L is a residue selected from the group consisting of a non-substituted or substituted saturated or unsaturated $C_1$-$C_{25}$, $C_1$-$C_{18}$, $C_1$-$C_{10}$ or $C_1$-$C_5$ hydrocarbon radical which may be straight, branched or cyclic; wherein the carbon chains of said residues optionally can include one or more of the elements oxygen, nitrogen, sulphur, phosphorous, silicon or boron for at least one of the selected silanes.

In another embodiment according to the present invention, L is a residue selected from the group consisting of a non-substituted or substituted saturated or unsaturated $C_1$-$C_{25}$, $C_1$-$C_{18}$, $C_1$-$C_{10}$ or $C_1$-$C_5$ hydrocarbon radical which may be straight or branched; wherein the carbon chains of said residues optionally can include one or more of the elements oxygen, nitrogen, sulphur, phosphorous, silicon or boron.

In another embodiment according to the present invention, L is a residue selected from the group consisting of a non-substituted or substituted saturated or unsaturated $C_1$-$C_{25}$, $C_1$-$C_{18}$, $C_1$-$C_{10}$ or $C_1$-$C_5$ hydrocarbon radical which may be straight or branched; wherein the carbon chains of said residues optionally can include one or more of the elements oxygen, nitrogen, sulphur, phosphorous, silicon or boron for at least one of the selected silanes.

In another embodiment according to the present invention, L is a residue selected from the group consisting of a non-substituted or substituted saturated or unsaturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, L is a residue selected from the group consisting of a non-substituted or substituted saturated or unsaturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron for at least one of the selected silanes.

In another embodiment according to the present invention, L is a residue selected from the group consisting of a non-substituted saturated or unsaturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, L is a residue selected from the group consisting of a non-substituted saturated or unsaturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron for at least one of the selected silanes.

In another embodiment according to the present invention, L is a residue selected from the group consisting of a non-substituted saturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, L is a residue selected from the group consisting of a non-substituted saturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron for at least one of the selected silanes.

In another embodiment according to the present invention, L is a residue selected from the group consisting of a non-substituted saturated $C_1$-$C_{18}$, non-substituted saturated $C_1$-$C_{10}$ or non-substituted saturated $C_1$-$C_5$ hydrocarbon radical which may be straight.

In another embodiment according to the present invention, L is a residue selected from the group consisting of a non-substituted saturated $C_1$-$C_{18}$, non-substituted saturated $C_1$-$C_{10}$ or non-substituted saturated $C_1$-$C_5$ hydrocarbon radical which may be straight for at least one of the selected silanes.

In a preferred embodiment according to the present invention, L is a radical of the formula —$CH_2$—$CH_2$—$CH_2$— (example 1a and 1b, section i).

In a preferred embodiment according to the present invention, L is a radical of the formula —$CH_2$—$CH_2$—$CH_2$— (example 1a and 1b, section i) for at least one of the selected silanes.

Organic-Inorganic Hybrid Polymer, L-Group, Arylene

In the definition of L, the term "a residue selected from substituted or non-substituted arylene; wherein the carbon chains of said residues optionally can include one or more of the elements oxygen, nitrogen, sulphur, phosphorous, silicon or boron" refers to any univalent organic radical derived from a monocyclic or a polycyclic aromatic hydrocarbon by loss of two hydrogen atoms and is intended to include non-substituted or substituted arylene wherein the carbon chains of said residues optionally can include one or more of the elements oxygen, nitrogen, sulphur, phosphorous, silicon or boron.

In one embodiment according to the present invention, the substituted or non-substituted arylene is substituted arylene. In another embodiment according to the present invention, the substituted or non-substituted arylene is non-substituted arylene.

Organic-Inorganic Hybrid Polymer, L-Group, General

In one embodiment according to the present invention, the carbon chains of said residues include one or more of the elements oxygen, nitrogen, sulphur, phosphorous, silicon or boron. In another embodiment according to the present invention, the carbon chains of said residues do not include one or more of the elements oxygen, nitrogen, sulphur, phosphorous, silicon or boron.

Organic-Inorganic Hybrid Polymer, X-L-Group

In one embodiment according to the present invention, the X-L group is chosen such that it will not be hydrolyzed under the conditions that will be applied for the method.

Organic-Inorganic Hybrid Polymer, Y-Group

In one embodiment according to the present invention, Y is OH. In another embodiment according to the present invention, Y is OH for at least one of the selected silanes. In one embodiment according to the present invention, Y is a hydrolysable group selected from the group consisting of alkoxyl, aryloxyl, carboxyl, and halogen. In another embodiment according to the present invention, Y is a hydrolysable group selected from the group consisting of alkoxyl, aryloxyl, carboxyl, and halogen for at least one of the selected silanes. In one embodiment according to the present invention, Y is a hydrolysable group selected from the group consisting of alkoxyl, carboxyl, and halogen. In another embodiment according to the present invention, Y is a hydrolysable group selected from the group consisting of alkoxyl, carboxyl, and halogen for at least one of the selected silanes. In a preferred embodiment according to the present invention, Y is a hydrolysable group selected from alkoxyl, most preferably Y is ethoxyl (example 1a and 1b, section i). In a preferred embodiment according to the present invention, Y is a hydrolysable group selected from alkoxyl, most preferably Y is ethoxyl (example 1a and 1b, section i), for at least one of the selected silanes.

The term "alkoxyl" as used herein includes both straight and branched alkyl groups attached to the parent structure through an oxygen atom. Preferred alkoxyl groups are those containing from one to twenty-five carbon atoms and include methoxyl, ethoxyl, propoxyl, isopropoxyl, and the like. In addition, the alkoxyl group may be optionally substituted with one or more substituents.

The term "carboxyl" as used herein refers to a hydroxyl group which is attached to the parent structure through a carbonyl group, i.e. a compound of the formula

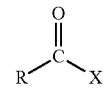

wherein R is the parent structure and X is OH.

The term "halogen" as used herein refers to chlorine, bromine, fluorine or iodine.

The term "aryloxyl" as used herein includes an aromatic group attached to the parent structure through an oxygen atom. Preferred aryloxyl groups are those containing 3 to 7 carbon atoms and include phenoxyl, and the like. In addition, the aryloxyl group may be optionally substituted with one or more substituents.

PREFERRED EMBODIMENT

In one preferred embodiment according to the present invention, the polymer is formed by controlled hydrolysis and condensation of a silane with formula (I), (II), (III) or (IV), most preferably formed by controlled hydrolysis and condensation of a silane with formula (I):

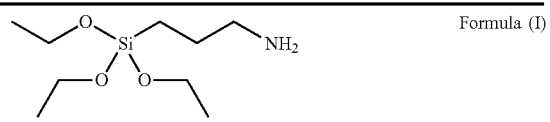

Formula (I)

Formula (I) is given by the general
formula: $(X$—$L$—$)_n Si(—Y)_{4-n}$;
wherein
X is —$NH_2$
n is 1;
L is —$CH_2$—$CH_2$—$CH_2$—; and
Y is —O—$CH_2$—$CH_3$.
(example 1a and 1b, section i)

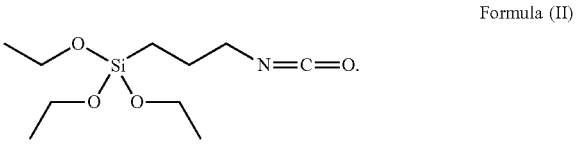

Formula (II)

Formula (II) is given by the general
formula: $(X$—$L$—$)_n Si(—Y)_{4-n}$;
wherein
X is —N=C=O
n is 1;
L is —$CH_2$—$CH_2$—$CH_2$—; and
Y is —O—$CH_2$—$CH_3$.

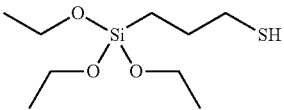

Formula (III)

Formula (III) is given by the general
formula: $(X-L-)_nSi(-Y)_{4-n}$;
wherein
X is —SH
n is 1;
L is —CH$_2$—CH$_2$—CH$_2$—; and
Y is —O—CH$_2$—CH$_3$.

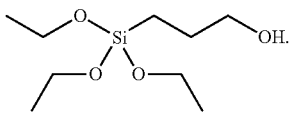

Formula (IV)

Formula (IV) is given by the general
formula: $(X-L-)_nSi(-Y)_{4-n}$;
wherein
X is —OH
n is 1;
L is —CH$_2$—CH$_2$—CH$_2$—; and
Y is —O—CH$_2$—CH$_3$.

If the polymer obtained in process step a) is a homopolymer, the second step in the process of manufacturing the at least one surface treating agent is only to be conducted if X is —NR$_1$R$_2$ and at least one of R$_1$ and R$_2$ is H or X is —N═C═O, SH or OH.

If the polymer obtained in process step a) is a copolymer, the second step in the process of manufacturing the at least one surface treating agent is only to be conducted if X is —NR$_1$R$_2$ and at least one of R$_1$ and R$_2$ is H for the selected silanes or for at least one of the selected silanes; or X is —N═C═O, SH or OH for the selected silanes or for at least one of the selected silanes.

The second step involves modifying the polymer by adding at least one reactant capable of forming a covalent bond between an atom of the X group and at least one atom of the reactant; the at least one reactant being a compound selected from the group consisting of cyclic anhydride and a compound of formula R—Z, wherein R is a residue selected from the group consisting of a non-substituted or substituted, saturated or unsaturated C$_1$-C$_{25}$ hydrocarbon radical which may be straight, branched or cyclic; aliphatic or aromatic carbonyl; and substituted or non-substituted aryl; wherein the carbon chains of said residues optionally can include one or more of the elements oxygen, nitrogen, sulphur, phosphorous, silicon or boron; or a residue selected from the group consisting of condensation products, addition products of one or more type of chemical substances such as acids, alcohols, phenols, amines, aldehydes or epoxides; and Z is a residue selected from the group consisting of alkoxyl, aryloxyl, cycloalkoxyl, carboxyl, formyl, acyl halide, isocyanate, hydroxyl, amine, epoxide, ester and halogen.

The third step in the process of manufacturing the at least one surface treating agent is not mandatory.

If the polymer obtained in process step a) is a homopolymer, the third step in the process of manufacturing the at least one surface treating agent may be conducted if X is —NR$_1$R$_2$. In one embodiment according to the present invention, this step is mandatory.

If the polymer obtained in process step a) is a copolymer, the third step in the process of manufacturing the at least one surface treating agent may be conducted if X is —NR$_1$R$_2$ for the elected silanes or for at least one of the selected silanes. In one embodiment according to the present invention, this step is mandatory.

The third step involves modifying the polymer by adding an acid that is capable of converting the N-atom of the X group to quaternary nitronium ions. In one embodiment according to the present invention the acid that is capable of converting the N-atom of the X group to quaternary nitronium ions is a Lewis acid or Broensted acid. In another embodiment according to the present invention the acid that is capable of converting the N-atom of the X group to quaternary nitronium ions is a Lewis acid. In another embodiment according to the present invention the acid that is capable of converting the N-atom of the X group to quaternary nitronium ions is a Broensted acid.

Degree of Derivatisation

In one embodiment according to the present invention, the polymer is modified by reacting at least 10%, such as at least 20%, at least 30%, at least 40%, at least 50%, at least 60%, at least 70%, at least 80%, at least 90%, at least 95%, at least 97%, at least 99% or 100% of the X-groups of the polymer with at least one reactant, such as one reactant, resulting in the formation of a covalent bond between an atom of the X group and at least one atom of the reactant.

In one embodiment according to the present invention, the polymer is modified by reacting the X-groups of the polymer with at least one reactant, such as one reactant, resulting in the formation of a covalent bond between an atom of the X group and at least one atom of the reactant; with the proviso that at least 10%, such as at least 20%, at least 30%, at least 40%, at least 50%, at least 60%, at least 70%, at least 80%, at least 90%, at least 95%, at least 97%, at least 99% or 100% of the X-groups of the polymer are covalently attached to the at least one reactant.

If each and all of the X-groups of the polymer are covalently attached to the at least one reactant, the composition comprising at least one surface treating agent will have an amine value of about 0. An amine value higher than 0 indicates that there are still some free amine groups that are not covalently attached to the at least one reactant.

In one embodiment according to the present invention, the composition comprising at least one surface treating agent has an amine value in the range range 0-800, such as 0-700, 0-600, 0-500, 0-400, 0-300, 0-200, 0-100, 0-50, 0-40, 0-30, 0-20, 0-10, 0-5, 0-4, 0-3, 0-2 or 0-1. In one embodiment, the amine value is 0.

The amine value is the number of milligrams KOH equivalent to the amine basicity in 1 g og pure sample. In the context of the present invention, the term "pure sample" is meant to refer to a pure sample of the surface treating agent(s). Amine value is herein measured in accordance with: Amine epoxide hardeners: Determination of primary, secondary and tertiary amine group—nitrogen content" (ISO 9702: 1996), English version of DIN EN ISO 9702—October 1998.

In one embodiment according to the present invention, the composition comprising at least one surface treating agent has an acid value in the range 0-5, preferably in the range 0-2 and more preferably in the range 0-1. The acid value is the number of milligrams KOH equivalent to the acidity in 1 g og pure sample. In the context of the present invention, the term "pure sample" is meant to refer to a pure sample of the acidic reagent that is reacted with the polymer during production of the organic-inorganic hybrid polymer. Acid value is herein measured in accordance with: Determination of free fatty acids (FFA) in oils (olive oil), Thermometric Titration—Metrohm Application Note No. H-036; Version 1.0.

Number of Reactants

In some embodiment according to the present invention, the polymer obtained in step a) is modified by reacting one or more of the X-groups of the polymer with at least one reactant, such as one reactant, two reactants or three reactants, resulting in the formation of a covalent bond between an atom of the X group and at least one atom of the reactant(s). It is to be understood that the second, third etc. reactant(s) may react either with the X group directly or react with the first reactant that is already attached to the X group through a covalent bond.

Polymer-Atoms Involved in Reaction with Reactant

In one embodiment according to the present invention, the X-group of the selected silane(s) or of at least one of the selected silanes is —NH$_2$. When the —NH$_2$ group is reacted with the at least one reactant, a covalent bond is formed between the nitrogen atom of the X group and at least one atom of the reactant.

In one embodiment according to the present invention the X-group of the selected silane(s) or of at least one of the selected silanes is —N=C=O. When the —N=C=O group is reacted with the at least one reactant, a covalent bond is formed between the carbon atom of the X group and at least one atom of the reactant.

In one embodiment according to the present invention the X-group of the selected silane(s) or of at least one of the selected silanes is —SH. When the —SH group is reacted with the at least one reactant a covalent bond is formed between the sulphur atom of the X group and at least one atom of the reactant.

In one embodiment according to the present invention the X-group of the selected silane(s) or of at least one of the selected silanes is —OH. When the —OH group is reacted with the at least one reactant a covalent bond is formed between the oxygen atom of the X group and at least one atom of the reactant.

In one embodiment according to the present invention, n is 1. In another embodiment according to the present invention, n is 2.

Reactant, Cyclic Anhydride

In one embodiment according to the present invention, the at least one reactant is a cyclic anhydride. The term "cyclic anhydride" refers to anhydrides that are derived from a single molecule of polycarboxylic acid, so that the anhydride group forms at least one heterocyclic nucleus with the remainder of the molecule of the polycarboxylic acid. They comprise anhydrides derived from aliphatic or cycloaliphatic polycarboxylic acids as well as from aromatic and heterocyclic polycarboxylic acids having at least two vicinal carboxy groups, including those which are saturated and those which are unsaturated. They include anhydrides derived from polycarboxylic acids which contain two or more sets of carboxy groups capable of forming cyclic anhydrides as well as those derived from polycarboxylic acids which contain only a single set of carboxy groups capable of forming a cyclic anhydride, all of which also may contain other carboxy groups.

In another embodiment according to the present invention, the at least one reactant is a cyclic anhydride and the term "cyclic anhydride" refers to a compound with the following formula:

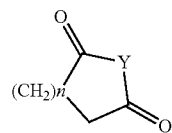

wherein n is 0-10;

Y is O, S or N—R$_1$; and

R$_1$ is a residue selected from the group consisting of hydrogen, non-substituted saturated or unsaturated C$_{1-25}$alkyl, substituted saturated or unsaturated C$_{1-25}$alkyl, substituted or non-substituted aryl, aliphatic or aromatic carbonyl, in which the carbon chains of said residues optionally may contain one or more of the elements oxygen, nitrogen, sulphur, phosphorous, silicon, and boron; or R$_1$ is chosen from condensation products or addition products of one or more type of chemical compounds such as acids, alcohols, phenols, amines, aldehydes or epoxides.

The term "alkyl" as used herein includes both straight and/or branched chain alkyl groups. Preferred alkyl groups are those containing from one to twenty five carbon atoms and include methyl, ethyl, propyl, isopropyl, butyl, isobutyl, tert-butyl, and the like. In addition, the alkyl group may be optionally substituted with one or more substituents. The alkyl group may be unsaturated or saturated.

The term "aryl" as used herein refers to any univalent organic radical derived from a monocyclic or polycyclic aromatic hydrocarbon by loss of one hydrogen atom. Examples of aryl groups are monocyclic and bicyclic aromatic groups containing 6 to 10 carbons in the ring portion (such as phenyl or naphthyl including 1-naphthyl and 2-naphthyl). The aryl groups may be substituted or non-substituted aryl groups.

The term "aliphatic carbonyl" as used herein refers to a compound R—CO—R', wherein R is substituted or non-substituted saturated or unsaturated C$_{1-25}$alkyl which may be straight, branched or cyclic and R' is H or substituted or non-substituted saturated or unsaturated C$_{1-25}$alkyl which may be straight, branched or cyclic.

The term "aromatic carbonyl" as used herein refers to aromatic ketone or aromatic aldehyde.

In another embodiment according to the present invention, the at least one reactant is a cyclic anhydride and the term "cyclic anhydride" refers to phthalic anhydride.

In one embodiment according to the present invention, the X-group of the selected silane(s) or of at least one of the selected silanes is —NH$_2$ and the at least one reactant is phthalic anhydride. When the —NH$_2$ group is reacted with phthalic anhydride, a covalent bond is formed between the nitrogen atom of the —NH$_2$ group and two carbon atoms of phthalic anhydride (see reaction scheme 1).

reaction scheme 1.

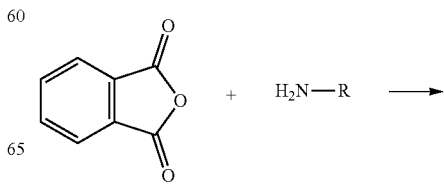

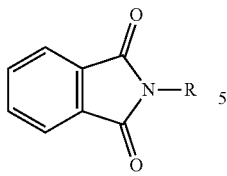

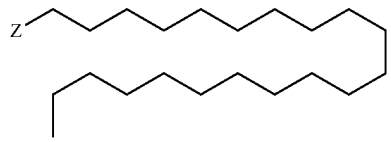

wherein Z is the Z group of the reactant.

Reactant Compound of Formula R—Z

In one embodiment according to the present invention, the reactant is selected from the group consisting of compounds of formula R—Z, wherein R is a residue selected from the group consisting of a non-substituted or substituted, saturated or unsaturated $C_1$-$C_{25}$ hydrocarbon radical which may be straight, branched or cyclic; aliphatic or aromatic carbonyl; and substituted or non-substituted aryl; wherein the carbon chains of said residues optionally can include one or more of the elements oxygen, nitrogen, sulphur, phosphorous, silicon or boron; or a residue selected from the group consisting of condensation products, addition products of one or more type of chemical substances such as acids, alcohols, phenols, amines, aldehydes or epoxides; and Z is a residue selected from the group consisting of alkoxyl, aryloxyl, cycloalkoxyl, carboxyl, formyl, acyl halide, isocyanate, hydroxyl, amine, epoxide, ester and halogen.

Reactant, R-Group, $C_1$-$C_{25}$ Hydrocarbon Radical

In the definition of R, the term "non-substituted or substituted saturated or unsaturated $C_1$-$C_{25}$ hydrocarbon radical which may be straight, branched or cyclic; wherein the carbon chains of said residues optionally can include one or more of the elements oxygen, nitrogen, sulphur, phosphorous, silicon or boron;" refers to a hydrocarbon radical having up to 25 carbon atoms, such as 1-18 carbon atoms, 1-10 carbon atoms or 1-5 carbon atoms, and is intended to include straight, branched and cyclic hydrocarbon radicals;
saturated or unsaturated hydrocarbon radicals; and
non-substituted or substituted hydrocarbon radicals;
wherein the carbon chains of said residues optionally can include one or more of the elements oxygen, nitrogen, sulphur, phosphorous, silicon or boron.

In one embodiment, the non-substituted or substituted saturated or unsaturated $C_1$-$C_{25}$ hydrocarbon radical which may be straight, branched or cyclic is a non-substituted or substituted saturated or unsaturated $C_1$-$C_{25}$, $C_1$-$C_{18}$, $C_1$-$C_{10}$ or $C_1$-$C_5$ hydrocarbon radical which may be straight or branched. In one embodiment, the non-substituted or substituted saturated or unsaturated $C_1$-$C_{25}$ hydrocarbon radical which may be straight, branched or cyclic is a non-substituted or substituted saturated or unsaturated $C_1$-$C_{25}$, $C_1$-$C_{18}$, $C_1$-$C_{10}$ or $C_1$-$C_5$ hydrocarbon radical which is straight. In one embodiment, the non-substituted or substituted saturated or unsaturated $C_1$-$C_{25}$ hydrocarbon radical which may be straight, branched or cyclic is a non-substituted or substituted saturated $C_1$-$C_{25}$. $C_1$-$C_{18}$, $C_1$-$C_{10}$ or $C_1$-$C_5$ hydrocarbon radical which is straight. In one embodiment, the non-substituted or substituted saturated or unsaturated $C_1$-$C_{25}$ hydrocarbon radical which may be straight, branched or cyclic is a non-substituted saturated $C_1$-$C_{25}$, $C_1$-$C_{18}$, $C_1$-$C_{10}$ or $C_1$-$C_5$ hydrocarbon radical which is straight. In another embodiment according to the present invention, the non-substituted or substituted saturated or unsaturated $C_1$-$C_{25}$ hydrocarbon radical which may be straight, branched or cyclic is a radical of the formula:

In one embodiment according to the present invention, R is a residue selected from the group consisting of a non-substituted or substituted saturated or unsaturated $C_1$-$C_{25}$. $C_1$-$C_{18}$, $C_1$-$C_{10}$ or $C_1$-$C_5$ hydrocarbon radical which may be straight, branched or cyclic; wherein the carbon chains of said residues optionally can include one or more of the elements oxygen, nitrogen, sulphur, phosphorous, silicon or boron.

In another embodiment according to the present invention, R is a residue selected from the group consisting of a non-substituted or substituted saturated or unsaturated $C_1$-$C_{25}$, $C_1$-$C_{18}$, $C_1$-$C_{10}$ or $C_1$-$C_5$ hydrocarbon radical which may be straight or branched; wherein the carbon chains of said residues optionally can include one or more of the elements oxygen, nitrogen, sulphur, phosphorous, silicon or boron.

In another embodiment according to the present invention, R is a residue selected from the group consisting of a non-substituted or substituted saturated or unsaturated $C_1$-$C_{25}$. $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, R is a residue selected from the group consisting of a non-substituted saturated or unsaturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, R is a residue selected from the group consisting of a non-substituted saturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, R is a residue selected from the group consisting of a non-substituted saturated $C_1$-$C_{25}$. $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, R is a residue selected from the group consisting of a non-substituted saturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, R is a residue selected from the group consisting of a non-substituted saturated $C_1$-$C_{25}$, $C_1$-$C_{18}$, $C_1$-$C_{10}$ or $C_1$-$C_5$ hydrocarbon radical which may be straight; wherein the carbon chains of said residues optionally can include one or more of the elements oxygen, nitrogen, sulphur, phosphorous, silicon or boron.

In another embodiment according to the present invention, R is a residue selected from the group consisting of a non-substituted saturated $C_1$-$C_{18}$, non-substituted saturated $C_1$-$C_{10}$ or non-substituted saturated $C_1$-$C_5$ hydrocarbon radical which may be straight.

In a preferred embodiment according to the present invention, R is a radical of the formula:

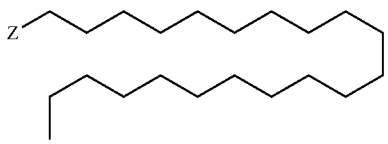

wherein Z is the Z group of the reactant (example 1a and 1b, section ii).

Reactant R-Group, Aryl

In the definition of R, the term "a residue selected from substituted or non-substituted aryl wherein the carbon chains of said residues optionally can include one or more of the elements oxygen, nitrogen, sulphur, phosphorous, silicon or boron" refers to any univalent organic radical derived from a monocyclic or a polycyclic aromatic hydrocarbon by loss of one hydrogen atoms and is intended to include non-substituted or substituted aryl;
wherein the carbon chains of said residues optionally can include one or more of the elements oxygen, nitrogen, sulphur, phosphorous, silicon or boron.

The term "aryl" as used herein refers to any univalent organic radical derived from a monocyclic or polycyclic aromatic hydrocarbon by loss of one hydrogen atom. Examples of aryl groups are monocyclic and bicyclic aromatic groups containing 6 to 10 carbons in the ring portion (such as phenyl or naphthyl including 1-naphthyl and 2-naphthyl). The aryl groups may be substituted or non-substituted aryl groups.

In one embodiment according to the present invention, R is substituted or non-substituted aryl, wherein the carbon chains of said residues optionally can include one or more of the elements oxygen, nitrogen, sulphur, phosphorous, silicon or boron.

Reactant R-Group, Aliphatic or Aromatic Carbonyl

In the definition of R, the term "aliphatic carbonyl" refers to a compound R—CO—R', wherein R is substituted or non-substituted saturated or unsaturated $C_{1-25}$alkyl which may be straight, branched or cyclic and R' is H or substituted or non-substituted saturated or unsaturated $C_{1-25}$alkyl which may be straight, branched or cyclic.

In the definition of R, the term "aromatic carbonyl" refers to aromatic ketone or aromatic aldehyde.

Reactant R-Group, Condensation Products or Addition Products

In one embodiment according to the present invention R is selected from condensation products or addition products of one or more type of chemical compounds such as acids, alcohols, phenols, amines, aldehydes or epoxides. In another embodiment according to the present invention, R is not selected from condensation products or addition products of one or more type of chemical compounds such as acids, alcohols, phenols, amines, aldehydes or epoxides.

Reactant R-Group, General

In one embodiment according to the present invention, the carbon chains of the residues listed in the definition of R include one or more of the elements oxygen, nitrogen, sulphur, phosphorous, silicon or boron. In another embodiment according to the present invention, the carbon chains of the residues listed in the definition of R does not include one or more of the elements oxygen, nitrogen, sulphur, phosphorous, silicon or boron.

Reactant, Z-Group

In one embodiment according to the present invention, Z is selected from the group consisting of alkoxyl, aryloxyl, cycloalkoxyl, carboxyl, formyl, acyl halide, isocyanate, hydroxyl, amine, epoxide, ester and halogen.

The term "alkoxyl" as used herein includes both straight and/or branched alkyl groups attached to the parent structure through an oxygen atom. Preferred alkoxyl groups are those containing from one to twenty five carbon atoms and include methoxyl, ethoxyl, propoxyl, isopropoxyl, and the like. In addition, the alkoxyl group may be optionally substituted with one or more substituents.

The term "aryloxyl" as used herein includes an aromatic group attached to the parent structure through an oxygen atom. Preferred aryloxyl groups are those containing 3 to 7 carbon atoms and include phenoxyl, and the like. In addition, the aryloxyl group may be optionally substituted with one or more substituents.

The term "cycloalkoxyl" as used herein includes cyclic alkoxyl groups. Preferred cycloalkyl groups are those containing 3 to 7 carbon atoms and include cyclopropyloxyl, cyclohexyloxyl, and the like. In addition, the cycloalkoxyl group may be optionally substituted with one or more substituents.

The term "carboxyl" as used herein refers to a hydroxy group which is attached to the parent structure through a carbonyl group, i.e. a compound of the formula

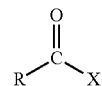

wherein R is the parent structure and X is OH.

The term "formyl" as used herein refers to a hydrogen atom which is attached to the parent structure through a carbonyl group, i.e. a compound of the formula

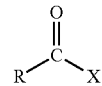

wherein R is the parent structure and X is hydrogen.

The term "acyl halide" as used herein refers to a halogen atom which is attached to the parent structure through a carbonyl group, i.e. a compound of the formula

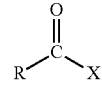

wherein R is the parent structure and X is a halogen atom.

The term "isocyanate" as used herein refers to a compound of the formula R—N=C=O, wherein R is the parent structure.

The term "hydroxyl" as used herein refers to a OH group which is directly attached to the parent structure, i.e. a compound of formula R—OH wherein R is the parent structure.

The term "amine" as used herein includes primary, secondary, tertiary and/or quaternary amines. Primary amines have the general formula R—NH$_2$, wherein R is the parent structure. Secondary amines have the general formula R1,R2-NH, wherein one of R1 and R2 is the parent structure. Tertiary amines have the general formula (R1,R2,R3)-N, wherein one of R$_1$, R2 and R3 is the parent structure. Quaternary amines have the general formula (R1, R2, R3, R4)-N+, wherein one of R1, R2, R3 and R4 is the parent structure.

The term "epoxide" as used herein refers to cyclic ether with a three-atom ring which is attached to the parent structure, i.e. a compound of the formula

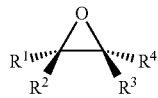

wherein one of the R groups is the parent structure.

The term "halogen" as used herein refers to chlorine, bromine, fluorine or iodine.

The term "parent structure" refers to the R group of the reactant.

In one embodiment according to the present invention, Z is selected from the group consisting of alkoxyl, carboxyl, formyl, acyl halide, isocyanate, hydroxyl, amine, epoxide, ester and halogen. In another embodiment, Z is selected from the group consisting of alkoxyl, carboxyl, formyl, acyl halide, epoxide, ester and halogen. In one preferred embodiment Z is carboxyl (example 1a and 1b, section ii).

Reactant, Preferred Embodiment

In one embodiment according to the present invention, the reactant is selected from the group consisting of a cyclic anhydride such as phthalic anhydride, a C$_1$-C$_{25}$ salicylate such as methyl salicylate, saturated or unsaturated C$_1$-C$_{25}$ fatty acid, C$_1$-C$_{25}$ 4-hydroxybenzoate such as methyl 4-hydroxybenzoate, and a monobasic ester formed from an organic acid such as methyl lactate. In another embodiment according to the present invention, the reactant is a fatty acid, such as stearic acid, erucic acid, behenic acid or a mix of fatty acids such as fatty acids from hydrogenated rapseed oil. It is also to be understood that the reactant may be used in combination with other reactants such as amino lauric acid or amino undecanoic acid.

Reactant Most Preferred Embodiment

In one embodiment according to the present invention, the organic-inorganic hybrid polymer is a homopolymer and the X-group of the polymer is —NH$_2$ and the at least one reactant is behenic acid. When the —NH$_2$ group is reacted with behenic acid, a covalent bond is formed between the nitrogen atom of the —NH$_2$ group and carboxyl carbon atoms of behenic acid (see reaction scheme 2).

reaction scheme 2.

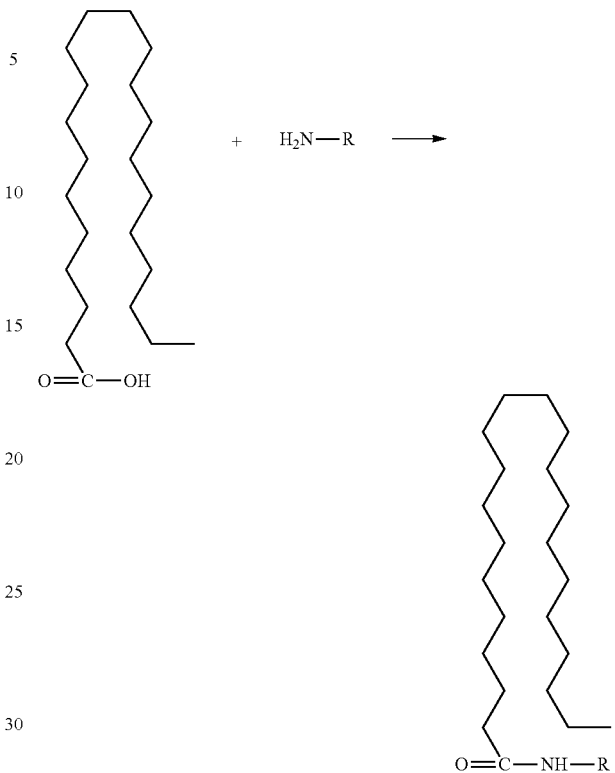

Manufacturing Organic-Inorganic Hybrid Polymer, Preferred Embodiment

In a preferred embodiment according to the present invention, the at least one surface treating agent is manufactured by controlled hydrolysis and condensation of a silane with the following general formula:

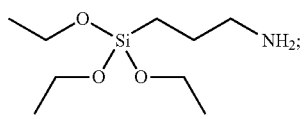

and
reacting the reaction product with a compound of formula:

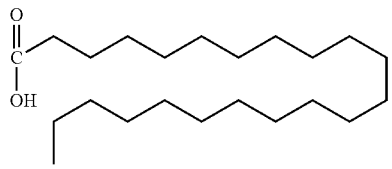 [SMILES: CCCCCCCCCCCCCCCCCCCCCC(=O)O]

(example 1a and 1b, section ii).

Surface Treating Agent

In one embodiment according to the present invention, the polymer is a polyhedral oligomeric silsesquioxane, i.e. a fully condensed oligomeric silsesquioxane. In another embodiment, the polymer is a partially condensed oligomeric silsesquioxane.

Examples of partially condensed silsesquioxane (right) and polyhedral oligomeric silsesquioxane (left) is depicted in FIG. 8.

In one embodiment, the polymer forms a cage structure.

In one embodiment according to the present invention, polymer is obtainable by a sol-gel process.

In one embodiment according to the present invention, the at least one surface treating agent is a polyhedral oligomeric silsesquioxane. In another embodiment at least one surface treating agent is a partially condensed oligomeric silsesquioxane.

In one embodiment according to the present invention, the organic-inorganic hybrid polymer present in the composition comprising at least one surface treating agent is in the form of polyhedral oligomeric silsesquioxanes. In another embodiment, the organic-inorganic hybrid polymer present in the composition comprising at least one surface treating agent is substantially in the form of polyhedral oligomeric silsesquioxanes.

In one embodiment according to the present invention, the organic-inorganic hybrid polymer present in the composition comprising at least one surface treating agent is in the form of partially condensed oligomeric silsesquioxanes. In another embodiment according to the present invention, the organic-inorganic hybrid polymer present in the composition comprising at least one surface treating agent is substantially in the form of partially condensed oligomeric silsesquioxanes.

In one embodiment according to the present invention, the composition comprising at least one surface treating agent comprises at least one organic-inorganic hybrid polymer. The at least one organic-inorganic hybrid polymer may be in the form of polyhedral oligomeric silsesquioxane, partially condensed oligomeric silsesquioxane, non-condensed oligomeric silsesquioxane or any mixture thereof. In one embodiment according to the present invention, the amount of the at least one surface treating agent which is in the form of a polyhedral oligomeric silsesquioxane (expressed in moles) divided by the total amount of the at least one surface treating agent (expressed in moles) is in the range 1 to 0.5, more preferably in the range 1 to 0.6, even more preferably in the range 1 to 0.7 and most preferably in the range 1 to 0.8, such as in the range 1 to 0.9 or 1 to 0.95. Total amount of the at least one surface treating agent is herein meant to refer to the total amount of the at least one surface treating agent disregarding whether it is in fully condensed form, partly condensed form or non-condensed form.

In another embodiment according to the present invention the amount of the at least one surface treating agent which is in the form of a polyhedral oligomeric silsesquioxane (expressed in moles) divided by the total amount of the at least one surface treating agent (expressed in moles) is 1. A molar fraction of 0.9 means that 90% of the molecules of the at least one surface treating agent is in the form of polyhedral oligomeric silsesquioxane while 10% of the molecules of the at least one surface treating agent is in the form of partially condensed or non-condensed oligomeric silsesquioxane.

In one embodiment according to the present invention, the at least one surface treating agent is obtainable by a sol-gel process.

The sol-gel process may involve:
controlled hydrolysis and condensation of one type of silane selected from the group of silanes represented by the following general formula: $(X-L-)_n Si(-Y)_{4-n}$; or
controlled hydrolysis and condensation of at least two different types of silanes independently selected from the group of silanes represented by the following general formula: $(X-L-)_n Si(-Y)_{4-n}$;

Silane with the following general formula: $(X-L)_n- Si(-Y)_{4-n}$ in which the X-L group contains one or more amine groups is particularly simple because no external catalyst is needed and because the process may be conducted at ambient temperature or under moderate heating. One example is controlled hydrolysis and condensation of 3-aminopropyl-triethoxysilane as described in WO0208343.

Controlled hydrolysis and condensation of silanes in which the X-L group contains one or more amine groups typically leads to a sol in which the resulting particulate polymer product has an organic-inorganic structure (hybrid polymer) that is comparable with hyperbranched polymer product with a number of more or less free amine groups. Such organic-inorganic hybrid polymers exhibit a large number of functional amine groups compared to their weight and/or volume. At the same time its compact structure compared to the structure of linear polymers ensures desirable properties like relatively low viscosity.

Utilization of Surface Treated Particulate Inorganic Material

The surface-treated particulate inorganic material according to the present invention is to suited for introduction into construction materials, such as plasters, cement, lightweight concrete, mortar, artificial stone, bricks, plastic, composite materials, paint, coating, thermoplastic foam and thermoset foam to lower the lbd, improve the mechanical strength of the mixture and reduce the ability to absorb water.

In examples 3a and 5a it is demonstrated that gypsum based plasters comprising the surface-treated particulate inorganic material according to the present invention have improved mechanical strength as compared to gypsum based plasters comprising unmodified particulate inorganic material.

Further, in examples 3b, 4 and 5b it is demonstrated that cement-based plasters comprising the surface-treated particulate inorganic material according to the present invention have improved mechanical strength as compared to cement-based plasters comprising unmodified particulate inorganic material.

Example 3c, 4b and 5c demonstrates that the surface-treated particulate inorganic material according to the present invention absorb significantly less water as compared to the same particulate inorganic material which has not been subjected to surface-treatment.

In addition to the above, it can clearly be seen from FIG. 4 that the surface-treated particulate inorganic material according to the present invention does not only provide improved mechanical strength to the material into which it is introduced but also has improved mechanical strength per se compared to unmodified particulate inorganic material as the granules stay almost undamaged after fracture. This performance implies increased particulate stability, not only during mixing but also during pumping and bulk transport (e.g. silo trucks).

Based on the results presented in example 3, 4 and 5 it seems clear that it is the surface coating which is responsible for the observed improvement in mechanical strength. In order for the improved mechanical strength to be long-lasting it is therefore important that the coating is strongly attached, either covalently or non-covalently, to the particulate inorganic material. As shown in example 6, only a small amount of coating material is lost after extensive washing which is a clear indication of high durability.

While the surface-treated particulate inorganic material according to the present invention exhibit high durability, particulate inorganic material which has been coated with silicone oil exhibit relatively low durability. Additionally, one may expect that a particulate inorganic material which has been coated with silicone oil suffers from bad bonding with other materials, such as mortar, plaster, cement and lightweight concrete, since silicone oil is a well know slip agent. As previously disclosed, strong bonding is typically associated with relatively high mechanical strength while weak bonding is typically associated with relatively low mechanical strength.

Thus, a second aspect of the present invention relates to a surface-treated particulate inorganic material obtainable by the method according to the first aspect of the present invention;

a third aspect of the present invention relates to use of the surface-treated particulate inorganic material according to the second aspect of the present invention, in admixture with construction materials or as additive in construction materials. The construction materials preferably being selected from the group consisting of plasters, cement, lightweight concrete, mortar, artificial stone, bricks, plastic, composite materials, paint, coating, thermoplastic foam and thermoset foam; and a fourth aspect of the present invention relates to a construction material comprising the surface-treated particulate inorganic material according to the second aspect of the present invention. The construction material preferably being selected from the group consisting of plasters, cement, lightweight concrete, mortar, artificial stone, bricks, plastic, composite materials, paint, coating, thermoplastic foam and thermoset foam.

In one embodiment according to the second aspect of the present invention, the surface-treated particulate inorganic material, obtainable by the method according to the first aspect of the present invention, is suited for introduction into construction materials for lowering the lbd of the mixture. In another embodiment according to the present invention, the surface-treated particulate inorganic material, obtainable by the method according to the first aspect of the present invention, is suited for introduction into construction materials for improving the mechanical strength of the mixture.

EXAMPLES

The following examples are meant to illustrate how to make and use the invention. They are not intended to limit the scope of the invention in any manner or to any degree.

Example 1a

Manufacture of Organic-Inorganic Hybrid Polymer Using Behenic Acid i) Process for Preparing a Polymer:

221.4 g (1.00 mol) of 3-aminopropyltriethoxysilane (A-1100, GE Silicones, USA) was placed in a 1000 mL round bottom flask with hose cooler and and magnetic stirring under nitrogen atmosphere. A mixture of 64.9 g (0.60 mol) 1-propoxy-2-propanol and 23.4 g (1.30 mol) water was added. The mixture was heated in an oil bath at 80° C. under reflux for 45 min. Then volatile reaction products or reactants were removed in a vacuum distillation at a oil bath temperature of about 150° C. and a vacuum gradient from about 1000 mbar to less than 20 mbar. The distillation was terminated when the pressure in the round bottom flask reached 20 mbar or less for 10 minutes. The reaction product was cooled to a temperature of about 120° C. and diluted with 1-propoxy-2-propanol to obtain a 50 wt % solution of polymer in 1-propoxy-2-propanol.

ii) Process for Modifying the Polymer Obtained in Step i)

A mixture of 1.8 kg of the 50 wt % solution of polymer in 1-propoxy-2-propanol obtained in i) and 0.9 kg 1-propoxy-2-propanol was placed in a 10 L reactor equipped with distillation means. The mixture was heated to a temperature of 135-145° C. and the pressure set to 800 mbar with open valve at distillate collector. A mixture of 6.37 kg behenic acid and 12.74 kg xylene was added gradually so that the reaction volume remained constant, i.e. amount added corresponds to the amount distilled off during distillation. Xylene is continuously added and distilled off until no water is visible in the distillate. Then the pressure is reduced to 500 mbar. The reactor is filled with argon, the pressure adjusted to 800 mbar and the reaction product is cooled to a temperature of 60° C. The reaction product is diluted with xylene, butoxyethanol and ethanol to obtain a 5 wt % solution of organic-inorganic hybrid polymer in a solvent mixture (xylene/butoxyethanol/ethanol 1.45/0.65/10 wt %).

Example 1b

Manufacture of Organic-Inorganic Hybrid Polymer Using Behenic Acid i) Process for Preparing a Polymer:

221.4 g (1.00 mol) of 3-aminopropyltriethoxysilane (A-1100, GE Silicones, USA) was placed in a 1000 mL round bottom flask with hose cooler and and magnetic stirring under nitrogen atmosphere. A mixture of 64.9 g (0.60 mol) 1-propoxy-2-propanol and 28.8 g (1.60 mol) water was added. The mixture was heated in an oil bath at 80° C. under reflux for 45 min. Then volatile reaction products or reactants were removed in a vacuum distillation at a oil bath temperature of about 150° C. and a vacuum gradient from about 1000 mbar to less than 20 mbar. The distillation was terminated when the pressure in the round bottom flask reached 20 mbar or less for 10 minutes. The reaction product was cooled to a temperature of about 120° C. and diluted with 1-propoxy-2-propanol to obtain a 50 wt % solution of polymer in 1-propoxy-2-propanol.

ii) Process for Modifying the Polymer Obtained in Step i)

A mixture of 1.8 kg of the 50 wt % solution of polymer in 1-propoxy-2-propanol obtained in i) and 0.9 kg 1-propoxy-2-propanol was placed in a 10 L reactor equipped with distillation means. The mixture was heated to a temperature of 135-145° C. and the pressure set to 800 mbar with open valve at distillate collector. A mixture of 6.37 kg behenic acid and 12.74 kg toluene was added gradually so that the reaction volume remained constant, i.e. amount added corresponds to the amount distilled off during distillation. Toluene is continuously added and distilled off until no water is visible in the distillate. Then the pressure is reduced to 500 mbar. The reactor is filled with argon, the pressure adjusted to 800 mbar and the reaction product is cooled to a temperature of 60° C. The reaction product is diluted with butoxyethanol and ethanol to obtain a 5 wt % solution of organic-inorganic hybrid polymer in a solvent mixture (butoxyethanol/ethanol 1:1 wt %).

Example 2a

Manufacturing of Surface-Treated Thermally Expanded Perlite i) Thermally Expanded Perlite Thermally expanded perlite is a pilot product having the following characteristics:

| Product | LBD [kg/m3] | Size $d_{50}$ (µm) |
|---|---|---|
| Thermal expanded perlite | 90 (±20) | 337 (±100) | ii) Composition Comprising a Surface Treating Agent

The diluted reaction product obtained in example 1b, section ii).

iii) Surface-Treated Thermally Expanded Perlite 120 g thermally expanded perlite (i) was introduced into a 2 L reactor. The reactor was equipped on both sides with tube connections providing a continuous flow of surface-treating agent (ii). The surface-treating agent (ii) being available from a reservoir and circulating in the closed system supported by a pump. The flow rate of the surface-treating agent was 10-15 ml/min at a residence time of 48 h. The surface treated expanded perlite was then subjected to a washing step, i.e. circulating of water or ethanol respectively, and then subjected to a drying step.

iv) Thermogravimetric Analysis (TGA)

Sample 1: 10 mg surface-treated thermally expanded perlite (iii).

Sample 1 was subjected to the following steps:

heat treatment from 30° C. to 190° C. at 20° C./minute under $N_2$ atmosphere;

heat treatment at a temperature of 190° C. for 60 minutes;

heat treatment from 190° C. to 900° C. at 20° C./minute, where the atmosphere is changed from $N_2$ atmosphere to air atmosphere when the temperature reached 770° C.

Organic moieties will be oxidised during the above heat treatment. By measuring the mass loss during heat treatment, the amount of organic moieties, in particular the amount of surface treating agent, deposited on the thermally expanded perlite may be measured.

Figure 1:
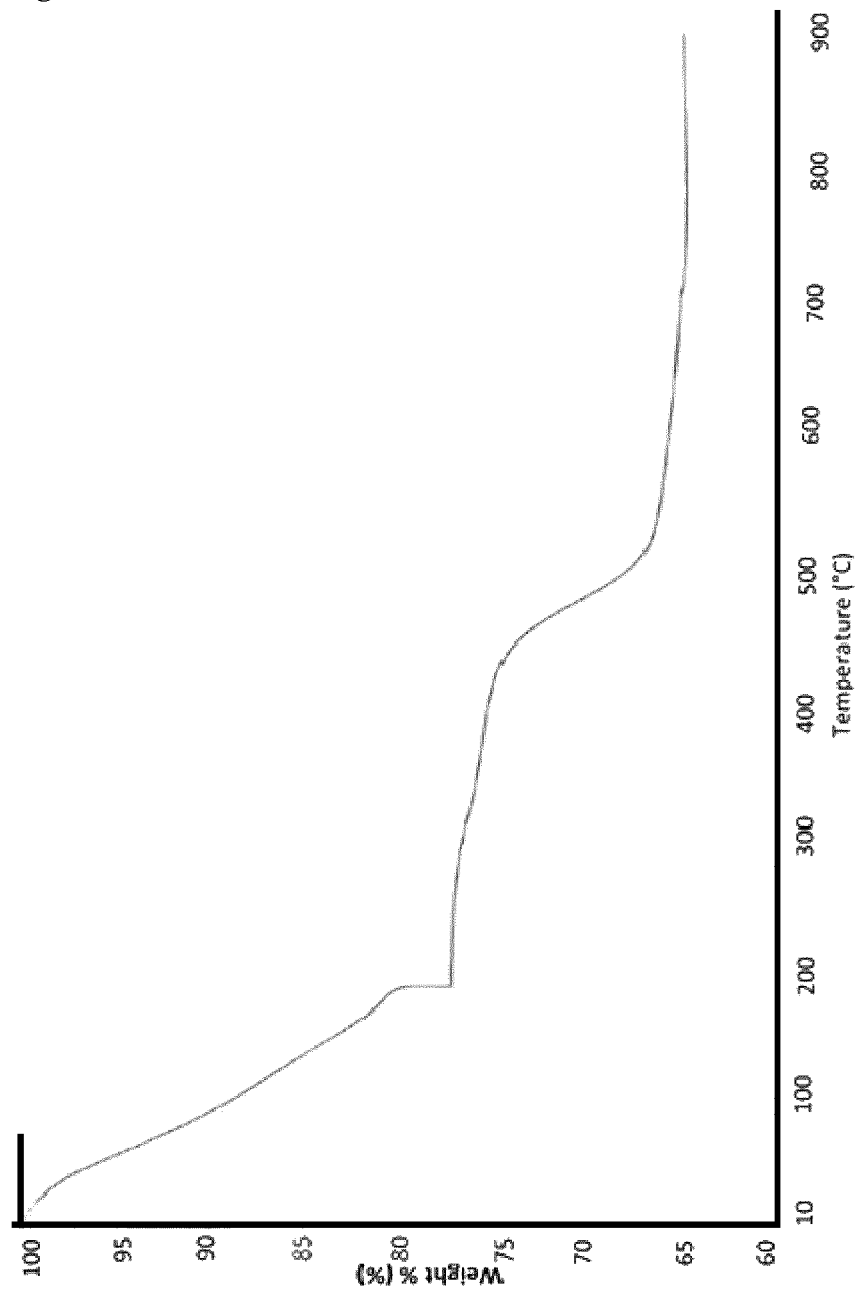
FIG. 1 illustrates the results of a thermogravimetric analysis of thermally expanded perlite coated with organic-inorganic hybrid polymer (example 2a). High mass loss corresponds to high amount organic-inorganic hybrid polymer deposited on the perlite particles.

Mass loss (weight %) as a function of temperature (° C.) during the above heat treatment is illustrated in FIG. 1. The curve reflects the mass loss as a function of temperature for sample sample 1. Based on the mass loss upon heating up to 900° C. the ratio of thermally expanded perlite:surface treating agent was calculated to 80:20 pbw (parts by weight).

Example 2b

Manufacturing of Surface-Treated Conventional Expanded Perlite i) Conventionally Expanded Perlite Conventionally expanded perlite is a commercially available product having the following characteristics:

| Product | LBD [kg/m3] | Size $d_{50}$ (µm) |
|---|---|---|
| Conventionally expanded perlite | 69 (±20) | 499 (±100) | ii) Composition Comprising a Surface Treating Agent

The diluted reaction product obtained in example 1b, section ii).

iii) Surface-Treated Thermally Expanded Perlite 250 g conventionally expanded perlite (i) wetted with 250 ml ethanol was introduced into a 10 L fluid bed processor. The fluid bed processor was equipped with spray nozzle providing a spray of surface-treating agent (ii). The surface-treating agent (ii) being available from a reservoir. The flow rate of the surface-treating agent was 10-15 ml/min at a residence time of 12-15 minutes and then subjected to a drying step.

iv) Thermogravimetric Analysis (TGA)

Sample 1: 2.5 mg surface-treated conventionally expanded perlite (iii).

Sample 1 was subjected to the following steps:

heat treatment from 30° C. to 190° C. at 20° C./minute under $N_2$ atmosphere;

heat treatment at a temperature of 190° C. for 60 minutes;

heat treatment from 190° C. to 900° C. at 20° C./minute, where the atmosphere is changed from $N_2$ atmosphere to air atmosphere when the temperature reached 770° C.

Organic moieties will be oxidised during the above heat treatment. By measuring the mass loss during heat treatment, the amount of organic moieties, in particular the amount of surface treating agent, deposited on the conventionally expanded perlite may be measured.

Mass loss (weight %) as a function of temperature (° C.) during the above heat treatment is illustrated in FIG. 2. The curve reflects the mass loss as a function of temperature for sample 1. Based on the mass loss upon heating up to 900° C. the ratio of conventionally expanded perlite:surface treating agent was calculated to 95:5 pbw (parts by weight).

Example 2c

Manufacturing of Surface-Treated Conventional Expanded Perlite i) Conventionally Expanded Perlite Conventionally expanded perlite is a commercially available product having the following characteristics:

| Expanded perlite | LBD [kg/m3] | Size $d_{50}$ (µm) |
|---|---|---|
| Conventionally expanded perlite | 69 (±20) | 499 (±100) | ii) Composition Comprising a Surface Treating Agent

The diluted reaction product obtained in example 1a, section ii).

iii) Surface-Treated Thermally Expanded Perlite 20 kg conventionally expanded perlite (i) moistened with 20 kg ethanol was introduced into a 450 L fluid bed processor. The fluid bed processor was equipped with three spray nozzles at the bottom of the processor providing spray of surface-treating agent (ii). The surface-treating agent (ii) being available from a reservoir. The flow rate of the surface-treating agent was 600 m³/hour at a residence time of 18 minutes. The surface treated expanded perlite was then subjected to a washing step, i.e. circulating of water or ethanol respectively, and then subjected to a drying step.

iv) Thermogravimetric Analysis (TGA)

Sample 1: 2.440 mg surface-treated conventionally expanded perlite (iii).

Sample 1 was subjected to the following steps:

heat treatment from 30° C. to 190° C. at 20° C./minute under $N_2$ atmosphere;

heat treatment at a temperature of 190° C. for 60 minutes;

heat treatment from 190° C. to 900° C. at 20° C./minute, where the atmosphere is changed from $N_2$ atmosphere to air atmosphere when the temperature reached 770° C.

Organic moieties will be oxidised during the above heat treatment. By measuring the mass loss during heat treatment, the amount of organic moieties, in particular the amount of surface treating agent, deposited on the conventionally expanded perlite may be measured.

Mass loss (weight %) as a function of temperature (° C.) during the above heat treatment is illustrated in FIG. 3. The curve reflects the mass loss as a function of temperature for sample 1. Based on the mass loss upon heating up to 900° C. the ratio of conventionally expanded perlite:surface treating agent was calculated to 95:5 pbw (parts by weight).

Example 3a

Gypsum Based Plasters—Modified Thermally Expanded Perlite

Gypsum based plasters are synthesized from gypsum, expanded perlite, additives and water. Three different gypsum plasters, all containing 2.2 wt % expanded perlite, have been prepared and tested with respect to their handling during mixing, application and hardening as well as ranking of their final mechanical properties. The different plasters have been prepared by the same method using the same ingredients except from expanded perlite which was selected from the expanded perlite products listed in table 1. The results of the tests are presented in table 2.

TABLE 1

Tested expanded perlite products

| | |
|---|---|
| Unmodified conventionally expanded perlite | The product referred to in example 2b, section i) and example 2c, section i). |
| Modified thermally expanded perlite (80:20) | The product obtained in example 2a, section iii). |
| Unmodified thermally expanded perlite | The product referred to in example 2a, section i). |

The formulation containing the modified thermally expanded perlite (80:20) shows workability and applicability which is comparable to other formulations used in the test. However, a ver low content of air bubbles has been documented by SEM (Scanning electron microscopy) images documenting the plaster surface at a fracture (see FIG. 4). The low content of air bubbles may explain the resulting improvement in mechanical properties like increased bending tensile strength ($\beta_{BZ}$=1.54 N/mm²), compression strength ($\beta_D$=5.12 N/mm²) and e-moduli (static: 2550 N/mm² and dynamic: 2.9 GPa). These parameters can be related to increased compressive strength and correspond to a performance improvement of about 30% as compared to standard formulation using conventional expanded perlite (standard). Further, FIG. 4 also illustrate the better mechanical stability of the modified thermally expanded perlite (80:20) as the granules stay almost undamaged after the fracture.

Example 3b

Cement-Based Plasters—Modified Thermally Expanded Perlite

Cement-based plasters are synthesized from portland cement, expanded perite (for the partial or complete replacement of sand), a mineral based plasticiser, hydrated lime and water. Three different Cement-based plasters, all containing 1.35 wt % expanded perlite, have been prepared and tested with respect to their handling during mixing, application and hardening as well as ranking of their final mechanical properties. The different plasters have been prepared by the same method using the same ingredients except from expanded perlite which was selected from the expanded perlite products listed in table 1. The results of the tests are presented in table 3.

TABLE 2

| Product Gypsum-based plaster-formulation | bending tensile strength $\beta_{BZ}$N/mm² 7 d | compression strength $\beta_n$ 7 d | bending tensile strength $\beta_n$N/mm² 28 d | compression strength $\beta_{BZ}$N/mm² 28 d | dynamic E-Modul [GPa] 7 d | static E-modulus [N/mm²] 7 d |
|---|---|---|---|---|---|---|
| unmodified conventionally expanded perlite | — | 2.74 | 1.04 | 2.88 | | |
| modified thermally expanded perlite (80:20) | 1.51 | 5.00 | 1.54 | 5.12 | | |
| unmodified thermally expanded perlite | 1.01 | 3.15 | 1.06 | 3.11 | | |
| unmodified conventionally expanded perlite | | | | | 1.7 | 1500 |
| modified thermally expanded perlite (80:20) | | | | | 2.9 | 2550 |
| unmodified thermally expanded perlite | | | | | 2.6 | 1950 |

Flexural and compressive strength have been measured in accordance with EN 1015-11.

TABLE 3

| Product Cement-based plaster-formulation | bending tensile strength $\beta_{BZ}$N/mm² 7 d | compression strength $\beta_n$ 7 d | bending tensile strength $\beta_n$N/mm² 28 d | compression strength $\beta_{BZ}$N/mm² 28 d | dynamic E-Modul [GPa] 7 d | static E-modulus [N/mm²] 7 d |
|---|---|---|---|---|---|---|
| unmodified conventionally expanded perlite | 0.70 | 1.21 | 1.1 | 2.57 | — | 1500 |
| modified thermally expanded perlite (80:20) | 1.05 | 1.87 | 1.35 | 3.31 | — | 2350 |
| unmodified thermally expanded perlite | 1.04 | 1.67 | 1.35 | 3.35 | — | 1800 |

Flexural and compressive strength have been measured in accordance with EN 1015-11.

Example 3c

Water Absorption—Modified Thermally Expanded Perlite

Water absorption (water uptake) of lightweight fillers is determined with the Enslin method (DIN 18132) using 0.100 g sample (see table 1). The modified thermal expanded perlite is reducing the water uptake by 89% and resulting in a water uptake of 0.55 g/g expanded perlite compared to a water uptake of 3.95 g/g unmodified thermal expanded perlite (FIG. 9).

Example 4a

Cement-Based Plasters—Modified Conventionally Expanded Perlite

Cement-based plasters are synthesized from portland cement, expanded perlite (for the partial or complete replacement of sand), a mineral based plasticiser, hydrated lime and water. Two different cement-based plasters, all containing 1.35 wt % expanded perlite, have been prepared and tested with respect to their handling during mixing, application and hardening as well as ranking of their final mechanical properties. The different plasters have been prepared by the same method using the same ingredients except from expanded perlite which was selected from the expanded perlite products listed in table 4. The results of the tests are presented in table 5.

Example 4b

Water Absorption—Modified Conventionally Expanded Perlite

Water absorption (water uptake) of lightweight fillers is determined with the Enslin method (DIN 18132) using 0.100 g sample (see table 4). The modified conventional expanded perlite (95:5) is reducing the water uptake by 46% and resulting in a water uptake of 0.48 g/g expanded perlite compared to a water uptake of 0.88 g/g unmodified conventional expanded perlite (FIG. 10).

Example 5a

Gypsum-Based Plasters—Modified Conventionally Expanded Perlite

Gypsum-based plasters are synthesized from gypsum, expanded perlite, additives and water. Two different gypsum-based plasters, all containing 2.2 wt % expanded perlite, have been prepared and tested with respect to their handling during mixing, application and hardening as well as ranking of their final mechanical properties. The different plasters have been prepared by the same method using the same ingredients except from expanded perlite which was selected from the expanded perlite products listed in table 6. The results of the tests are presented in table 7.

TABLE 4

| Tested expanded perlite products | |
|---|---|
| Unmodified conventionally expanded perlite | The product referred to in example 2b, section i) and example 2c, section i). |
| Modified conventionally expanded perlite (95:5) | The product obtained in example 2b, section iii). |

TABLE 6

| Tested expanded perlite products | |
|---|---|
| Unmodified conventionally expanded perlite | The product referred to in example 2b, section i) and example 2c, section i). |
| Modified conventionally expanded perlite (95:5) | The product obtained in example 2c, section iii). |

TABLE 5

| Product Cement-based plaster-formulation | bending tensile strength $\beta_{BZ}$[N/mm²] 7 d | compression strength $\beta_D$[N/mm²] 7 d | bending tensile strength $\beta_D$[N/mm²] 28 d | compression strength $\beta_{BZ}$[N/mm²] 28 d | dynamic E-Modul [GPa] 28 d | static E-modulus [N/mm²] 28 d |
|---|---|---|---|---|---|---|
| modified conventionally expanded perlite (95:5) | 0.74 | 1.44 | 1.4 | 3.14 | 4 | — |
| unmodified conventionally expanded perlite | 0.34 | 0.88 | 0.93 | 1.91 | 2.9 | — |

Flexural and compressive strength have been measured in accordance with EN 1015-11.

TABLE 7

| Product Gypsum-based plaster-formulation | bending tensile strength $\beta_{BZ}[N/mm^2]$ 7 d | compression strength $\beta_D[N/mm^2]$ 7 d | bending tensile strength $\beta_D[N/mm^2]$ 28 d | compression strength $\beta_{BZ}[N/mm^2]$ 28 d | dynamic E-Modul [GPa] 28 d | static E-modulus [N/mm²] 28 d |
|---|---|---|---|---|---|---|
| modified conventionally expanded perlite (95:5) | 0.93 | 2.47 | — | — | 1.6 | — |
| unmodified conventionally expanded perlite | 0.75 | 1.69 | — | — | 1.3 | — |

Flexural and compressive strength have been measured in accordance with EN 1015-11.

Example 5b

Cement-Based Plasters—Modified Conventionally Expanded Perlite

Cement-based plasters are synthesized from portland cement, expanded perlite (for the partial or complete replacement of sand), a mineral based plasticiser, hydrated lime and water. Two different cement-based plasters, all containing 1.35 wt % expanded perlite have been prepared and tested with respect to their handling during mixing, application and hardening as well as ranking of their final mechanical properties. The different plasters have been prepared by the same method using the same ingredients except from expanded perlite which was selected from the expanded perlite products listed in table 6. The results of the tests are presented in table 8.

TABLE 8

| Product Cement-based plaster-formulation | bending tensile strength $\beta_{BZ}$ [N/mm²] 7 d | compression strength $\beta_D[N/]mm^2$ 7 d | bending tensile strength $\beta_D[N/mm^2]$ 28 d | compression strength $\beta_{BZ}$ [N/mm²] 28 d | dynamic E-Modul [GPa] 28 d |
|---|---|---|---|---|---|
| modified conventionally expanded perlite (95:5) | 0.44 | 1.01 | 0.89 | 2.35 | 3.2 |
| unmodified conventionally expanded perlite | 0.34 | 0.88 | 0.93 | 1.91 | 2.9 |

Flexural and compressive strength have been measured in accordance with EN 1015-11.

Example 5c

Water Absorption—Modified Conventionally Expanded Perlite

Water absorption (water uptake) of lightweight fillers is determined with the Enslin method (DIN 18132) using 0.100 g sample (see table 6). The modified conventional expanded perlite (95:5) is reducing the water uptake by 38% and resulting in a water uptake of 0.55 g/g expanded perlite compared to a water uptake of 0.88 g/g unmodified conventional expanded perlite (FIG. 11).

Example 6

Durability of Surface Coatings on Expanded Perlite
i) Chemicals

| Hexamethyldisiloxane | HMDSO, puriss., ≥98.5% (GC); CAS Number 107-46-0; 52630 Fluka |
| Silicone oil | [—Si(CH₃)₂O—]ₙ, viscosity 10 cSt (25° C.); CAS Number 63148-62-9; 378321 Aldrich |
| Stearic acid | Grade I, ≥98.5% (capillary GC); CAS Number 57-11-4; S4751 Sigma |
| Organic-inorganic hybrid polymer | The diluted reaction product obtained in example 1b, section ii) | ii) Preparation of Coating Solutions 2.5 g hexamethyldisiloxane (i) was dissolved in 122.5 g ethanol.

2.5 g silicone oil (i) was dissolved in 122.5 g ethanol.

2.5 g stearic acid (i) was dissolved in 122.5 g ethanol.

2.5 g K-stearate (i) was dissolved in 122.5 g ethanol (K-stearate was prepared from stearic acid and equal molar KOH (solid)).

The diluted reaction product obtained in example 1b, section ii) was further diluted using ethanol to obtain a 2 wt % solution of organic-inorganic hybrid polymer.

iii) Preparation of "Before Washing Procedure" Samples 5 g thermally expanded perlite (product referred to in example 2a, section i)) was filled in a tea-bag and immersed for 72 h into one of the coating solutions (ii) which were under magnetic stirring. The filled tea bag was removed from the solution and washed by immersion into 100 ml ethanol under magnetic stirring for 20 min. The filled tea bag was then subjected to drying at room temperature for 16 hours, at 40° C. for 2 hours and then at room temperature for 16 hours.

The reference sample is prepared in accordance with the above method except that the coating solution is replaced by ethanol.

iv) Preparation of "after Washing Procedure" Samples 5 g thermally expanded perlite (product referred to in example 2a, section i)) was filled in a tea-bag and immersed for 72 h into one of the coating solutions (ii) which were under magnetic stirring. The filled tea bag was removed from the solution and washed by immersion into 100 ml ethanol under magnetic stirring for 20 min. The filled tea bag was then subjected to drying at room temperature for 16 hours, at 40° C. for 2 hours and then at room temperature for 16 hours.

The filled tea bag is then subjected to a subsequent washing procedure carried out twice by immersion into 100 ml ethanol under magnetic stirring for 20 min before finally drying at room temperature with good ventilation (24 h), 2 h/40° C. and final drying at room temperature (16 h).

The reference sample is prepared in accordance with the above method except that the coating solution is replaced by ethanol.

v) Thermogravimetric Analysis (TGA)

| | |
|---|---|
| Sample 1 | 10 mg thermally expanded perlite reference "before washing" |
| Sample 2 | 10 mg thermally expanded perlite reference "after washing" |
| Sample 3 | 10 mg thermally expanded perlite coated with silicone oil "before washing" |
| Sample 4 | 10 mg thermally expanded perlite coated with silicone oil "after washing" |
| Sample 5 | 10 mg thermally expanded perlite coated with hexamethyldisiloxane "before washing" |
| Sample 6 | 10 mg thermally expanded perlite coated with hexamethyldisiloxane "after washing" |
| Sample 7 | 10 mg thermally expanded perlite coated with stearic acid "before washing" |
| Sample 8 | 10 mg thermally expanded perlite coated with stearic acid "after washing" |
| Sample 9 | 10 mg thermally expanded perlite coated with K-stearate "before washing" |
| Sample 10 | 10 mg thermally expanded perlite coated with K-stearate "after washing" |
| Sample 11 | 10 mg thermally expanded perlite coated with organic-inorganic hybrid polymer "before washing" |
| Sample 12 | 10 mg thermally expanded perlite coated with organic-inorganic hybrid polymer "after washing" |

Sample 1-12 were independently subjected to the following steps:
heat treatment from 30° C. to 190° C. at 20° C./minute under $N_2$ atmosphere;
heat treatment at a temperature of 190° C. for 60 minutes;
heat treatment from 190° C. to 900° C. at 20° C./minute, where the atmosphere is changed from $N_2$ atmosphere to air atmosphere when the temperature reached 770° C.

Organic moieties will be oxidised during the above heat treatment. By measuring the mass loss during heat treatment, the amount of organic moieties, in particular the amount of surface treating agent, deposited on the thermally expanded perlite may be measured.

As can be seen from the results of the thermogravimetric analysis depicted in FIG. 6, the amount (weight) of organic-inorganic hybrid polymer deposited on thermally expanded perlite is superior as compared to the other coating materials. The results also clearly indicates that the organic-inorganic hybrid polymer has high durability compared to other alternative coating materials since only small amount of coating is lost after the sample has been subjected to extensive washing procedures.

Example 7

Manufacturing of Surface-Treated Lightweight Expanded Clay Aggregate
i) Lightweight Expanded Clay Aggregate
Lightweight expanded clay aggregates are commercially available products and may have the following characteristics:

| Lightweight expanded clay aggregate | LBD [kg/m3] | Size $d_{50}$ [mm] |
|---|---|---|
| Specification | 825(±20) | 8 (±4) | ii) Composition Comprising a Surface Treating Agent
The diluted reaction product obtained in example 1a, section ii).

iii) Surface-Treated Lightweight Expanded Clay Aggregates
Lightweight expanded clay aggregates (i) were introduced into a 2 L reactor. The reactor was equipped on both sides with tube connections providing a continuous flow of surface-treating agent (ii). The surface-treating agent (ii) being available from a reservoir and circulating in the closed system supported by a pump. The flow rate of the surface-treating agent was 10-15 ml/min at a residence time of 48 h. The surface treated lightweight expanded clay aggregates were then subjected to a washing step, i.e. circulating of water or ethanol respectively, and then subjected to a drying step.
iv) Thermogravimetric Analysis (TGA)
Sample 1: 11 mg surface-treated lightweight expanded clay aggregates (iii).
Sample 2: 5.5 mg unmodified lightweight expanded clay aggregates as control.
Samples 1 and 2 were subjected to the following steps:
heat treatment from 30° C. to 190° C. at 20° C./minute under $N_2$ atmosphere;
heat treatment at a temperature of 190° C. for 60 minutes;
heat treatment from 190° C. to 900° C. at 20° C./minute, where the atmosphere is changed from $N_2$ atmosphere to air atmosphere when the temperature reached 770° C.

Organic moieties in sample 1 will be oxidised during the above heat treatment. By measuring the mass loss during heat treatment, the amount of organic moieties, in particular the amount of surface treating agent, deposited on the thermally expanded perlite may be measured—especially after comparison to mass loss observed for sample 2 (i.e. corrected mass loss for sample 1).

Corrected mass loss (weight %) as a function of temperature (° C.) during the above heat treatment is illustrated in FIG. 12. The curve reflects the mass loss as a function of temperature for sample 1 compared to the unmodified lightweight expanded clay aggregates (sample 2) used as control. Based on the mass loss upon heating up to 900° C. the ratio of lightweight expanded clay aggregates:surface treating agent was calculated to 99.80:0.20 pbw (parts by weight).

Example 8

Water Absorption—Modified Lightweight Expanded Clay Aggregates

TABLE 9

| Tested lightweight expanded clay aggregates | |
|---|---|
| Unmodified lightweight expanded clay aggregates | The product referred to in example 7, section i). |
| Modified lightweight expanded clay aggregates (99, 85:0, 15) | The product obtained in example 7, section iii). |

Water absorption (water uptake) of lightweight expanded clay aggregates is determined with an internal method based on NS-EN 1097-6:2000 (1 h water absorption) using approx. 50 g sample (see table 9). The modified lightweight expanded clay aggregates are reducing the water uptake by 60% and resulting in a water uptake of approx. 4.0% m/m modified lightweight expanded clay aggregate related to a water uptake of approx. 6.3% m/m unmodified lightweight expanded clay aggregate in a comparative study.

We claim:
1. A method for manufacturing a surface-treated particulate inorganic material, the method comprising:
providing a particulate inorganic material; and
bringing the particulate inorganic material into contact with a composition comprising at least one surface treating agent and thereby obtain a surface-treated particulate inorganic material;
wherein
the at least one surface treating agent is an organic-inorganic hybrid polymer;
the organic-inorganic hybrid polymer being selected from the group of polymers obtainable by a process comprising:
a) forming a polymer by controlled hydrolysis and condensation of only one type of silane selected from the group of silanes represented by the following general formula: $(X\text{-}L\text{-})_n Si(\text{-}Y)_{4-n}$;
wherein
X is $-NR_1R_2$, $-N=C=O$, SH or OH
$R_1$ and $R_2$ are residues independently selected from the group consisting of hydrogen; non-substituted or substituted, saturated or unsaturated $C_1$-$C_{25}$ hydrocarbon radical; and substituted or non-substituted aryl; or $R_1$ and $R_2$ are independently selected from the group consisting of condensation products, addition products of one or more type of chemical substances;
n is 1 or 2;
L is a direct bond; or a residue selected from the group consisting of non-substituted or substituted, saturated or unsaturated $C_1$-$C_{25}$ hydrocarbon radical; and substituted or non-substituted arylene; and
Y is a hydrolysable group or OH;
and
b) if X is $-NR_1R_2$ and at least one of $R_1$ and $R_2$ is H for the selected silane; or X is $-N=C=O$, SH or OH for the selected silane
adding at least one reactant capable of forming a covalent bond between an atom of the X group and at least one atom of the reactant;
the at least one reactant being a compound selected from the group consisting of cyclic anhydride and a compound of formula R-Z,
wherein
R is a residue selected from the group consisting of a non-substituted or substituted, saturated or unsaturated $C_1$-$C_{25}$ hydrocarbon radical which may be straight, branched or cyclic; aliphatic or aromatic carbonyl; and substituted or non-substituted aryl; or a residue selected from the group consisting of condensation products, addition products of one or more type of chemical substances; and
Z is a residue selected from the group consisting of alkoxyl, aryloxyl, cycloalkoxyl, carboxyl, formyl, acyl halide, isocyanate, hydroxyl, amine, epoxide, ester and halogen.

2. The method according to claim 1, wherein the particulate inorganic material is selected from the group consisting of perlite, expanded perlite, bentonite, diatomite, silica, barite, gypsum, limestone, kaolin, clay, expanded clay, biochar, mica, talc, vermiculite, synthetic calcium silicate hydrate, natural silicates, volcanic ash and other volcanic products such as fly ash and glass, slag, pumice, shale, synthetic silicates, alumino silicates, diatomaceous earth, wollastonite, slate, expanded slate; and any mixture thereof.

3. The method according to claim 1, wherein the particulate inorganic material has an effective particle density or a loose bulk density in the range 10-950 kg/m$^3$.

4. The method according to claim 1, wherein the particulate inorganic material has an effective particle density or a loose bulk density in the range 30-150 kg/m$^3$.

5. The method according to claim 1, wherein the bringing the particulate inorganic material into contact with a composition comprising at least one surface treating agent comprises applying at least one layer of the composition comprising at least one surface treating agent onto the particulate inorganic material.

6. The method according to claim 1, wherein the ratio of particulate inorganic material:surface treating agent(s) is in the range 99.9:0.1 pbw to 70:30 pbw.

7. The method according to claim 1, wherein X is $-NR_1R_2$.

8. The method according to claim 1, wherein L is a residue selected from the group consisting of non-substituted or substituted, saturated or unsaturated $C_1$-$C_{25}$ hydrocarbon radical; and substituted or non-substituted arylene.

9. The method according to claim 1, wherein Y is OH or a hydrolysable group selected from the group consisting of alkoxyl, aryloxyl, carboxyl, and halogen.

10. The method according to claim 1, wherein the at least one reactant is selected from the group consisting of a cyclic anhydride, a $C_1$-$C_{25}$ salicylate, saturated or unsaturated $C_1$-$C_{25}$ fatty acid, $C_1$-$C_{25}$ 4-hydroxybenzoate, a monobasic ester formed from an organic acid, and an epoxide.

11. The method according to claim 1, wherein the particulate inorganic material is expanded perlite; the polymer is formed by controlled hydrolysis and condensation of one type of silane selected from the group of silanes represented by the following general formula: $(X\text{-}L\text{-})_n Si(-Y)_{4-n}$; X is $NH_2$; n is 1; L is $-CH_2-CH_2-CH_2-$; and Y is $-O-CH_2-CH_3$.

12. The method according to claim 11, wherein the at least one reactant is behenic acid.

13. The method according to claim 1, wherein the composition comprising at least one surface treating agent is a water-based composition comprising at least one surface treating agent.

14. The method according to claim 13, wherein the water-based composition comprising at least one surface treating agent further comprises at least one emulsifier.

15. The method according to claim 1, wherein the composition comprising at least one surface treating agent is emulsified in water with the aid of at least one emulsifier.

16. The method according to claim 1, wherein the particulate inorganic material is not a transparent material, in particular not glass.

17. The method according to claim 1, wherein the X-groups of the polymer obtained by process steps a) to b) provides the polymer with a hydrophobic surface; and the polymer obtained by process steps a) to b) is not subjected to heat treatment which would decompose the hydrophobic surface of the polymer.

18. The method according to claim 1, wherein the X-groups of the polymer obtained by process steps a) to b) provides the polymer with a hydrophobic surface; and the surface-treated particulate inorganic material is not subjected to heat treatment which would decompose the hydrophobic surface of the polymer which is attached to the particulate inorganic material.

19. The method according to claim 1, wherein the surface-treated particulate inorganic material is not subjected to calcination.

20. The method according to claim 1, wherein the surface-treated particulate inorganic material and/or the polymer obtained by process steps a) to b) not subjected to heat treatment at temperatures above 300° C.

21. The method according to claim 1, wherein the process comprising steps a) to b) does not include subsequently adding a metal alkoxide.

22. The method according to claim 1, wherein a metal alkoxide is not added to the composition comprising at least one surface treating agent.

23. The method according to claim 1, wherein the organic-inorganic hybrid polymer has an average particle diameter of less than 30 nm.

24. The method according to claim 1, wherein the organic-inorganic hybrid polymer prepared by step a) to b) is not covalently attached to other polymers that have an average particle diameter that is less than 80% of the average particle diameter of the at least one surface treating agent.

25. The method according to claim 1, wherein particle size distribution ($d_{50}$) of the particulate inorganic material is in the range 10 nm-30000 microns.

26. The method according to claim 1, wherein the particulate inorganic material to be surface treated is exposed to water or a suitable organic solvent prior to bringing the particulate inorganic material into contact with a composition comprising at least one surface treating agent.

27. The method according to claim 1, wherein the organic-inorganic hybrid polymer is in the form of fully condensed oligomeric silsesquioxane, partially condensed oligomeric silsesquioxane, non-condensed oligomeric silsesquioxane or any mixture thereof; with the proviso that the number of moles of fully condensed oligomeric silsesquioxane divided by the total number of moles of organic-inorganic hybrid polymer is in the range 1 to 0.5.

28. The method according to claim 27, wherein the number of moles of fully condensed oligomeric silsesquioxane divided by the total number of moles of organic-inorganic hybrid polymer is in the range 1 to 0.8.

29. The method according to claim 1, wherein if X is —$NR_1R_2$ for the selected silane, then adding an acid that is capable of converting the N-atom of the X group to quaternary nitronium ions.

30. A method for manufacturing a surface-treated particulate inorganic material, the method comprising:
providing a particulate inorganic material; and
bringing the particulate inorganic material into contact with a composition comprising at least one surface treating agent and thereby obtain a surface-treated particulate inorganic material; wherein
the at least one surface treating agent is an organic-inorganic hybrid polymer;
the organic-inorganic hybrid polymer being selected from the group of polymers obtainable by a process comprising:

a) forming a polymer by controlled hydrolysis and condensation of at least two different types of silanes independently selected from the group of silanes represented by the following general formula: [(X-L-)$_n$Si(—Y)$_{4-n}$;] wherein
X is —$NR_1R_2$, —N=C=O, SH or OH
$R_1$ and R2 are residues independently selected from the group consisting of hydrogen; non-substituted or substituted, saturated or unsaturated $C_1$-$C_{25}$ hydrocarbon radical; and substituted or non-substituted aryl; or $R_1$ and $R_2$ are independently selected from the group consisting of condensation products, addition products of one or more type of chemical substances;
n is 1 or 2;
L is a direct bond; or a residue selected from the group consisting of non-substituted or substituted, saturated or unsaturated $C_1$-$C_{25}$ hydrocarbon radical; and substituted or non-substituted arylene; and
Y is a hydrolysable group or OH; and
b) if X is —$NR_1R_2$ and at least one of $R_1$ and $R_2$ is H for at least one of the at least two different types of selected silanes; or X is —N=C=O, SH or OH for at least one of the at least two different types of selected silanes adding at least one reactant capable of forming a covalent bond between an atom of the X group and at least one atom of the reactant;
the at least one reactant being a compound selected from the group consisting of cyclic anhydride and a compound of formula R-Z, wherein
R is a residue selected from the group consisting of a non-substituted or substituted, saturated or unsaturated $C_1$-$C_{25}$ hydrocarbon radical which may be straight, branched or cyclic; aliphatic or aromatic carbonyl; and substituted or non-substituted aryl; or a residue selected from the group consisting of condensation products, addition products of one or more type of chemical substances; and
Z is a residue selected from the group consisting of alkoxyl, aryloxyl,cycloalkoxyl, carboxyl, formyl, acyl halide, isocyanate, hydroxyl, amine, epoxide, ester and halogen.

31. The method according to claim 30, wherein if X is —$NR_1R_2$ for the selected silanes, then adding an acid that is capable of converting the N-atom of the X group to quaternary nitronium ions.

\* \* \* \* \*

UNITED STATES PATENT AND TRADEMARK OFFICE
CERTIFICATE OF CORRECTION

PATENT NO. : 10,882,787 B2
APPLICATION NO. : 15/755989
DATED : January 5, 2021
INVENTOR(S) : Monika Pilz et al.

Page 1 of 1

It is certified that error appears in the above-identified patent and that said Letters Patent is hereby corrected as shown below:

In the Claims

Column 54, Claim 30, Line 4, delete "(X-L-)" and insert in its place --(X-L-)$_n$--.

Column 54, Claim 30, Line 5, delete "$_n$".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*